US012238114B2

(12) United States Patent
Gamache et al.

(10) Patent No.: US 12,238,114 B2
(45) Date of Patent: *Feb. 25, 2025

(54) METHOD, APPARATUS, AND COMPUTER PROGRAM PRODUCT FOR SELECTIVELY GRANTING PERMISSIONS TO GROUP-BASED OBJECTS IN A GROUP-BASED COMMUNICATION SYSTEM

(71) Applicant: Salesforce, Inc., San Francisco, CA (US)

(72) Inventors: Meagan Gamache, Palo Alto, CA (US); Diogenes Brito, Brooklyn, NY (US); Buster Benson, Berkeley, CA (US); Kefan Xie, Toronto (CA); Paul Matthew Jennings, Redwood City, CA (US); Christopher Sullivan, Wellesley, MA (US); Benjamin William Scholey Redman, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,615

(22) Filed: Oct. 24, 2023

(65) Prior Publication Data

US 2024/0129319 A1 Apr. 18, 2024

Related U.S. Application Data

(63) Continuation of application No. 17/380,580, filed on Jul. 20, 2021, now Pat. No. 11,848,936, which is a (Continued)

(51) Int. Cl.
*H04L 9/40* (2022.01)
*H04L 67/53* (2022.01)

(52) U.S. Cl.
CPC ........ *H04L 63/104* (2013.01); *H04L 63/0853* (2013.01); *H04L 67/53* (2022.05)

(58) Field of Classification Search
CPC ... H04L 63/104; H04L 63/0853; H04L 67/53; H04L 63/08; H04L 67/34;
(Continued)

(56) References Cited

U.S. PATENT DOCUMENTS 9,529,985 B2 * 12/2016 Khalil ................. H04L 63/10
10,404,703 B1 * 9/2019 Peterson ........... G06Q 20/3223
(Continued)

*Primary Examiner* — Lizbeth Torres-Diaz
(74) *Attorney, Agent, or Firm* — Holland & Hart LLP

(57) ABSTRACT

Embodiments of the present disclosure provide methods, systems, apparatuses, and computer program products that provide for an improved, more efficient, and more stable system of networked computing devices. The embodiments disclose an apparatus and system that enable client devices to selectively grant to third party applications permissions to access group-based communication objects of a group-based communication system. The apparatus and system further enable client devices to selectively grant to third party applications permissions to take specific actions with regards to the group-based communication objects within the system. To accomplish the improvements, the disclosed systems, apparatuses, and computing devices maintain a record of the permissions granted to third party applications in a permissions table stored in a computer storage device. The permissions table may be modified to expand the permissions granted to the third party application without requiring a new authentication process that issues a new authenticating token. Further, third party applications are installed at a group level and not at a user level within the system, which increases system stability and efficiency.

20 Claims, 35 Drawing Sheets

Related U.S. Application Data continuation of application No. 15/894,821, filed on Feb. 12, 2018, now Pat. No. 11,095,657.

(58) Field of Classification Search
CPC ...... G06F 2221/2115; G06F 8/60; G06F 8/61; H04W 4/08; H04W 12/06; H04W 12/71
See application file for complete search history.

(56) References Cited

U.S. PATENT DOCUMENTS

| | | | | |
|---|---|---|---|---|
| 10,567,301 | B2* | 2/2020 | Flier | H04L 67/52 |
| 10,965,547 | B1* | 3/2021 | Esposito | H04L 67/10 |
| 11,153,293 | B1* | 10/2021 | Fan | H04L 63/083 |
| 11,297,066 | B2* | 4/2022 | Wei | G06F 21/6218 |
| 11,630,917 | B2* | 4/2023 | Fox | H04W 12/02 |
| | | | | 726/28 |
| 11,941,643 | B2* | 3/2024 | Rungta | G06Q 40/03 |
| 2002/0178271 | A1* | 11/2002 | Graham | H04L 63/104 |
| | | | | 709/229 |
| 2003/0088786 | A1* | 5/2003 | Moran | H04L 63/102 |
| | | | | 726/4 |
| 2006/0153121 | A1* | 7/2006 | Creamer | G06Q 30/02 |
| | | | | 370/328 |
| 2007/0174213 | A1* | 7/2007 | Whitehouse | G06Q 30/02 |
| | | | | 705/401 |
| 2014/0007195 | A1* | 1/2014 | Gupta | H04L 63/0876 |
| | | | | 726/4 |
| 2014/0096221 | A1* | 4/2014 | Wallis | G06F 21/335 |
| | | | | 726/9 |
| 2015/0135286 | A1* | 5/2015 | Egan | H04L 63/0884 |
| | | | | 726/5 |
| 2015/0163206 | A1* | 6/2015 | McCarthy | G06F 21/6227 |
| | | | | 726/4 |
| 2015/0199010 | A1* | 7/2015 | Coleman | H04L 67/01 |
| | | | | 345/156 |
| 2016/0007138 | A1* | 1/2016 | Palanisamy | H04L 12/28 |
| | | | | 455/41.2 |
| 2016/0012465 | A1* | 1/2016 | Sharp | G06Q 20/321 |
| | | | | 705/14.17 |
| 2016/0232515 | A1* | 8/2016 | Jhas | G06Q 20/3278 |
| 2016/0269360 | A1* | 9/2016 | Gluck | H04L 63/08 |
| 2017/0201588 | A1* | 7/2017 | Schmidt | H04L 63/105 |
| 2017/0242711 | A1* | 8/2017 | Dey | H04L 67/34 |
| 2017/0346830 | A1* | 11/2017 | Goldfarb | H04L 63/104 |
| 2018/0033072 | A1* | 2/2018 | Karthikeyan | H04L 63/104 |
| 2018/0287982 | A1* | 10/2018 | Draeger | H04L 51/216 |
| 2019/0258818 | A1* | 8/2019 | Yu | G06F 21/44 |
| 2019/0296978 | A1* | 9/2019 | Seshadri | H04L 63/20 |
| 2019/0347082 | A1* | 11/2019 | Gurtin | H04L 67/02 |
| 2020/0036723 | A1* | 1/2020 | Ranchod | G06F 8/60 |
| 2020/0169559 | A1* | 5/2020 | Jones | H04L 63/102 |
| 2020/0218525 | A1* | 7/2020 | Gurtin | G06F 8/71 |
| 2022/0201049 | A1* | 6/2022 | Jamison | H04L 65/403 |

* cited by examiner

302

App Tokens Table

| App Token Identifier | App User Identifier | Group or Team Identifier | App Identifier | App Team Identifier | Group-Based Communication Scope Descriptor | Secret / cryptic string | date_create | Date_revoke | Expire_at | created_by |
|---|---|---|---|---|---|---|---|---|---|---|
| bigint(20) unsigned | bigint(20) unsigned | bigint(20) unsigned | bigint(20) unsigned | bigint(20) unsigned | text / ascii | varchar(256) | int(10) | int(10) | int(10) | bigint(20) |
| bigint(20) unsigned | bigint(20) unsigned | bigint(20) unsigned | bigint(20) unsigned | bigint(20) unsigned | text / ascii | varchar(256) | int(10) | int(10) | int(10) | bigint(20) |
| bigint(20) unsigned | bigint(20) unsigned | bigint(20) unsigned | bigint(20) unsigned | bigint(20) unsigned | text / ascii | varchar(256) | int(10) | int(10) | int(10) | bigint(20) |
| bigint(20) unsigned | bigint(20) unsigned | bigint(20) unsigned | bigint(20) unsigned | bigint(20) unsigned | text / ascii | varchar(256) | int(10) | int(10) | int(10) | bigint(20) |
| bigint(20) unsigned | bigint(20) unsigned | bigint(20) unsigned | bigint(20) unsigned | bigint(20) unsigned | text / ascii | varchar(256) | int(10) | int(10) | int(10) | bigint(20) |

Columns labeled: 309, 311, 310, 314, 313, 312

FIG. 3C

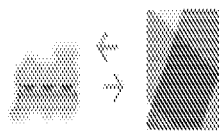
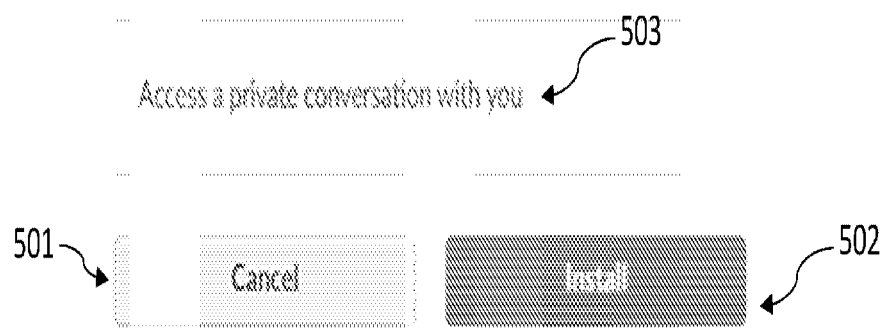
FIG. 5A

Lunch Train for Workspaces would like to request access to # atlanta-united:

Select Permitted Actions atlanta-united

Permitted Actions:  ● Read
　　　　　　　　　● Write
　　　　　　　　　○ Access History and Files

Lunch Train for Workspaces would like to request access to new channels and actions:

Select Channels and Permitted Actions

○ # finance

Permitted Actions:   ○ Read
                             ○ Write
                             ○ Access History and Files ● # atlanta-united Permitted Actions:   ● Read
                             ● Write
                             ○ Access History and Files

[ Cancel ]    [ Allow ] ←— 750

Lunch Train for Workspaces Settings

Channel Access

App Homepage
View in App Directory
Support for this App

What can Lunch Train for Workspaces do in this workspace?

On My Test Company, Lunch Train for Workspaces can:

Direct message 1 person

Lunch Train for Workspaces would like to request access to objects in channel # atlanta-united:

Select Objects

○ All objects in channel

◉ These objects in channel

○ File # Accounting Statement.doc

◉ File # Product X Design Schematics.pdf

◉ File # Flowers.gif

○ Emoji # Smile

○ No objects in channel

— 950

Lunch Train for Workspaces would like to request access to channel # atlanta-united:

Select Actions

○ All actions generally afforded to the app in channels

◉ These actions

○ Read messages in channel

◉ Post messages in channel

◉ Add slash commands in channel

○ Access objects in channel

○ No actions

— 970

[ Cancel ]  [ Allow ]

Lunch Train for Workspaces would like to request access to objects in channel # atlanta-united:

Select Objects in Channel and Permitted Actions

○ All objects in channel and all actions

● These objects in channel

○ File # Accounting Statement.doc
        Permitted Actions: ○ Read
                                ○ Write
                                ○ Upload and Modify ● File # Product X Design Schematics.xls
        Permitted Actions: ● Read
                                ● Write
                                ○ Upload and Modify ○ No objects in channel

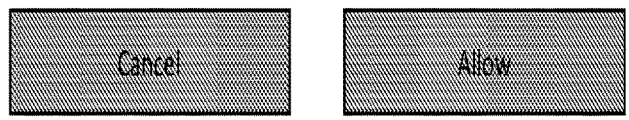
— 990

FIG. 9I

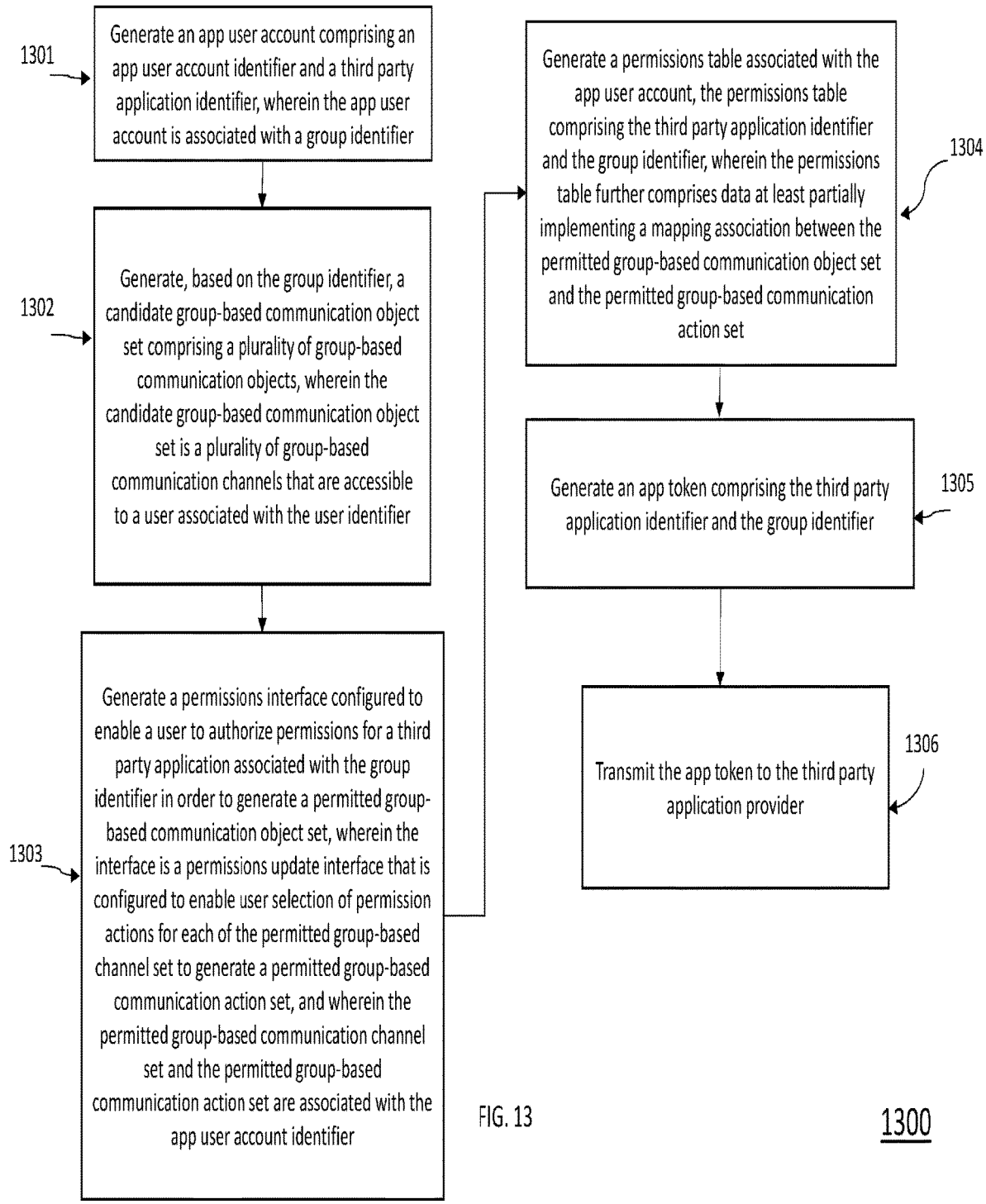
FIG. 13        1300

1400

1401 → Store, in the permissions table, the candidate group-based communication object set 1402 → Generate a permitted group-based communication object set by: associating a selection indication with each of the one or more group-based communication objects of the candidate group-based communication object set upon user selection via the interface, and
associating a permission scope with each of the one or more group-based communication objects that is associated with the selection indication upon user selection of the permission scope by the permissions interface 1403 → Store, in the permissions table, the permitted group-based communication object set

FIG. 14

METHOD, APPARATUS, AND COMPUTER PROGRAM PRODUCT FOR SELECTIVELY GRANTING PERMISSIONS TO GROUP-BASED OBJECTS IN A GROUP-BASED COMMUNICATION SYSTEM

CROSS REFERENCES

The present application for patent is a continuation of U.S. patent application Ser. No. 17/380,580 by GAMACHE et al., entitled "METHOD, APPARATUS, AND COMPUTER PROGRAM PRODUCT FOR SELECTIVELY GRANTING PERMISSIONS TO GROUP-BASED OBJECTS IN A GROUP-BASED COMMUNICATION SYSTEM," filed Jul. 20, 2021, which is a continuation of U.S. patent application Ser. No. 15/894,821 by GAMACHE et al., entitled "METHOD, APPARATUS, AND COMPUTER PROGRAM PRODUCT FOR SELECTIVELY GRANTING PERMISSIONS TO GROUP-BASED OBJECTS IN A GROUP-BASED COMMUNICATION SYSTEM," filed Feb. 12, 2018, each of which is assigned to the assignee hereof, and each of which is expressly incorporated by reference herein.

BACKGROUND

Various messaging systems may support communication and collaboration among users across an enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

This specification relates to methods and apparatuses for selectively granting permissions to group-based communication objects in a group-based communication system. The apparatus is configured to include a group-based communication server, a group-based communication repository, and a plurality of group-based communication channels. The apparatus also includes at least one processor and at least one memory. To implement the improvements, the apparatus is configured to generate an app user account comprising an app user account identifier and a third party application identifier. The app user account is associated with a group identifier. The apparatus generates, based on the group identifier, a candidate group-based communication object set comprising a plurality of group-based communication objects. The apparatus generates a permissions interface configured to enable a user to authorize permissions for a third party application associated with the group identifier in order to generate a permitted group-based communication object set. The apparatus is further configured to generate a permissions table associated with the app user account, the permissions table comprising the third party application identifier and the group identifier. The apparatus also generates an app token comprising the third party application identifier and the group identifier. Finally, the apparatus is configured to transmit the app token to a third party application provider.

In a first variation of the above embodiment, the apparatus is configured such that the candidate group-based communication object set includes group-based communication channels, private multi-party direct messages, public group-based communication channels, private direct messages, files, and user accounts. In a further variation of this particular embodiment, the permissions interface is configured to enable user selection of one or more group-based communication objects of the candidate group-based communication object set to generate a permitted group-based communication object set, and the permitted group-based communication object set comprises a subset of the candidate group-based communication object set.

In another embodiment the first variation, the apparatus is configured so the app user account is further associated with a user identifier, and the candidate group-based communication object set is generated based on the group identifier and the user identifier.

In another embodiment of the first variation, the permissions interface is a group-based communication object permissions interface configured to enable a user selection of one or more group-based communication objects of the candidate group-based communication object set to generate a permitted group-based communication object set.

In another embodiment of the first variation, the permissions interface is a group-based communication object permissions interface configured to enable a user selection of one or more group-based communication actions of a candidate group-based communication action set to generate a permitted group-based communication action set.

In another embodiment of the first variation, the permissions interface is a group-based communication object permissions interface configured to enable a user selection of one or more group-based communication objects of the candidate group-based communication object set and one or more group-based communication actions of a candidate group-based communication action set to generate a permitted group-based communication object set and a permitted group-based communication action set.

In another embodiment of the first variation, the permissions interface is a permissions update interface configured to enable a user to authorize a modification of permissions related to at least one of (a) a group-based communication object included in a permitted group-based communication object set or (b) a group-based communication action included in a permitted group-based communication action set.

In a second variation of the apparatus, the permissions interface is configured to enable user selection of permission actions for each of the group-based communication objects in the permitted group-based communication object set to generate a permitted group-based communication action set, the permissions table further comprises mapping data at least partially implementing a mapping association between the permitted group-based communication object set and the permitted group-based communication action set and the permitted group-based communication object set and the permitted group-based communication action set are associated with the app user account identifier.

In another embodiment of the second variation, the candidate group-based communication object set is a plurality of group-based communication channels that are accessible to a user associated with the user identifier, and the permitted group-based communication object set is a permitted group-based communication channel set.

In a third variation of the apparatus, the apparatus is further configured to receive a permissions update request associated with the app user account identifier. The apparatus then generates a group-based communication object permissions update interface configured to enable user modification of the permitted group-based communication object set and the permitted group-based communication action set. Finally, the apparatus updates the group-based communication repository based on the user modification of the permitted group-based communication object set and the permitted group-based communication action set.

In another embodiment of the third variation, the permissions interface is configured to enable user selection of one or more group-based communication objects of the candidate group-based communication object set to generate a permitted group-based communication object set. Further, the permitted group-based communication object set comprises a subset of the candidate group-based communication object set.

In fourth variation of the apparatus, the candidate group-based communication object set is a plurality of group-based communication channels that are accessible to a user associated with the user identifier, the permitted group-based communication object set is a permitted group-based communication channel set, the permissions interface is a permissions update interface that is configured to enable user selection of permission actions for each of the permitted group-based channel set to generate a permitted group-based communication action set, and the permitted group-based communication channel set and the permitted group-based communication action set are associated with the app user account identifier. Further, in this variation of the apparatus, the permissions table further comprises mapping data least partially implementing a mapping association between the permitted group-based communication object set and the permitted group-based communication action set.

In another embodiment of the fourth variation, each group-based communication channel of the permitted group-based channel set is associated with a channel object set, and the group-based communication object permissions interface is further configured to enable user selection of permission actions for the channel object set.

In fifth variation of the apparatus, the apparatus is further configured to store, in the permissions table, the candidate group-based communication object set. The apparatus further generates the permitted group-based communication object set by: (a) associating a selection indication with each of the one or more group-based communication objects of the candidate group-based communication object set upon user selection via the permissions interface, and (b) associating a permission action with each of the one or more group-based communication objects of the candidate group-based communication object set that is associated with the selection indication upon user selection of the permission action by the group-based communication object permissions interface. Finally, the apparatus stores, in the group-based communication repository, the permitted group-based communication object set.

In a sixth variation of the apparatus, the apparatus is further configured to transmit to the third party application provider a trigger identifier. The apparatus also receives a permissions update request associated with the app user account identifier, and generates a permissions update interface configured to enable user modification of at least one of (a) a permitted group-based communication object set or (b) a permitted group-based communication action set. The apparatus continues with updating the group-based communication repository based on the user modification of the at least one of (a) the permitted group-based communication object set or (b) the permitted group-based communication action set. The apparatus then transmits a confirmation message to the third party application provider confirming user modification of the at least one of (a) the permitted group-based communication object set or (b) the permitted group-based communication action set.

In another embodiment of the sixth variation, the trigger identifier to the third party application provider in response to receiving at least one of: (a) a click signal indicating that a user clicked on an interactive button of a group-based communication interface, or (b) a command signal indicating that a user invoked a slash command via the group-based communication interface.

In a seventh variation of the apparatus, the apparatus is further configured generate an App DM configured for rendering within a group-based communication interface, the App DM comprising a plurality of tabs, and wherein at least one tab is a configuration tab for a third party application associated with the App DM. The apparatus then, in response to user engagement of the configuration tab of the App DM, generates a permissions interface configured to enable user modification of at least one of (a) a permitted group-based communication object set or (b) a permitted group-based communication action set, and update group-based communication repository based on the user modification of the at least one of (a) the permitted group-based communication object set or (b) the permitted group-based communication action set.

In another embodiment of the seventh variation, the App DM comprises an App DM group-based communication channel that is configured to display messaging communications posted by the app user account or the third party application provider.

In an eighth variation of the apparatus, the apparatus also receives a request associated with the app user account identifier, wherein the request comprises an indication to add a group-based communication object to the permissions table. The apparatus then continues by generating a group-based communication object communication permissions interface configured to enable user authorization of a modification of a permitted group-based communication object set and updating the permissions table based on the user authorization of the modification of the permitted group-based communication object set.

BRIEF DESCRIPTION OF THE DRAWINGS

Figure 1:
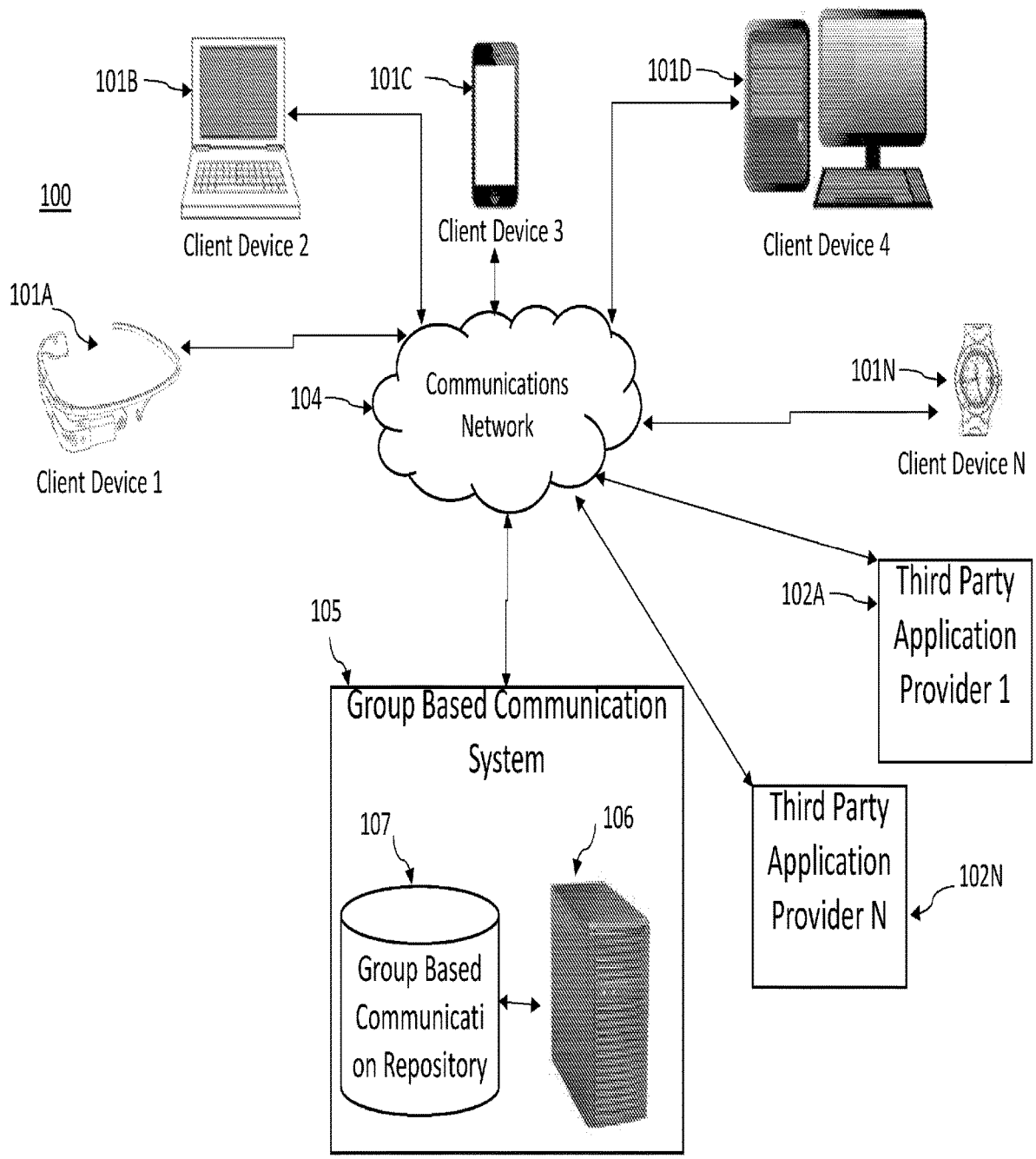
Figure 2:
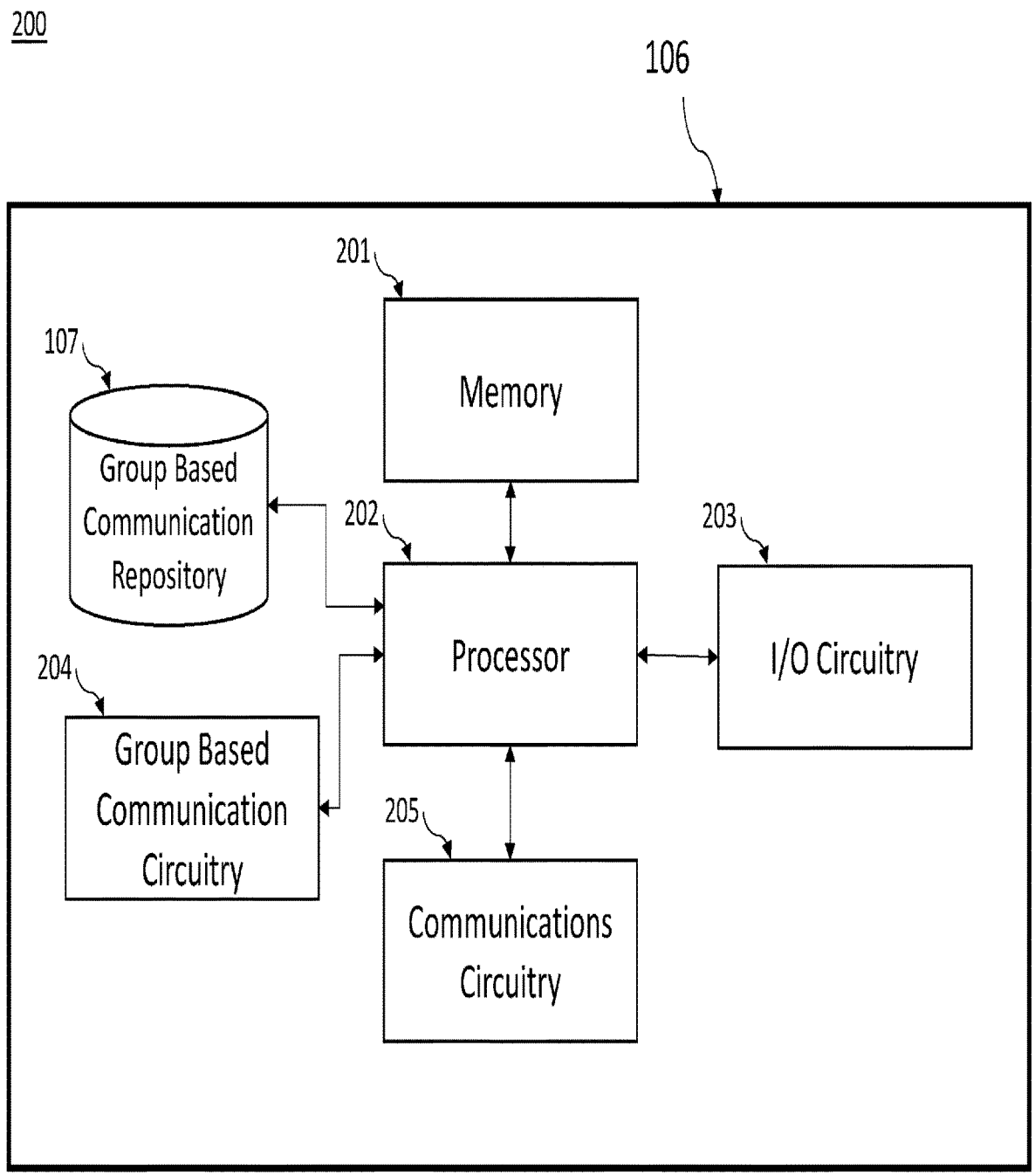
Figure 3A:
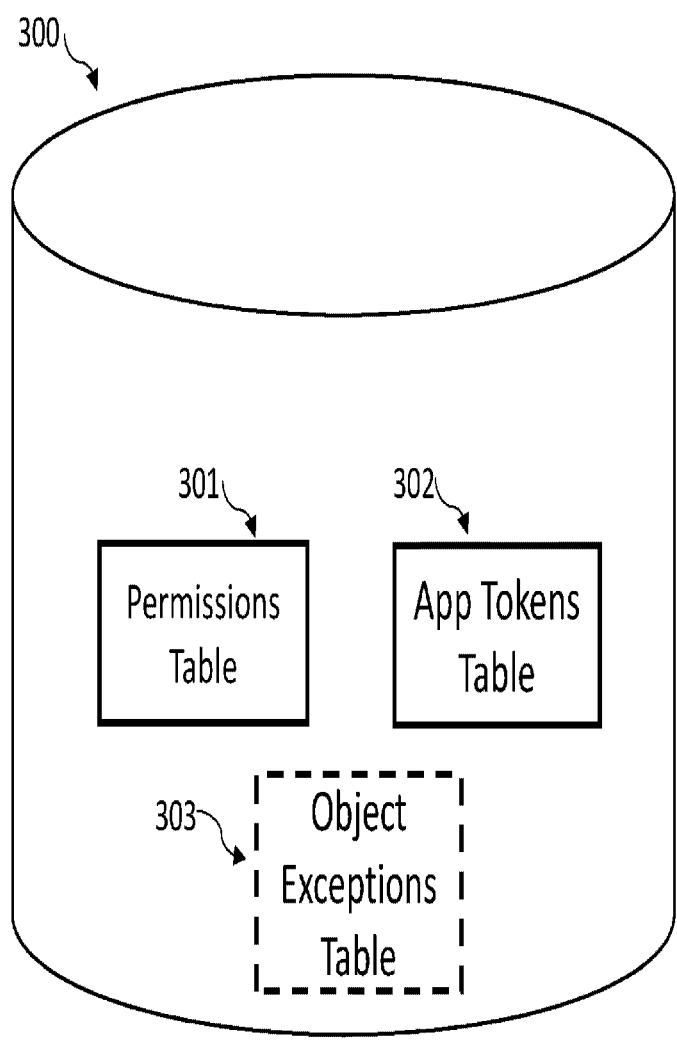
Figure 3B:
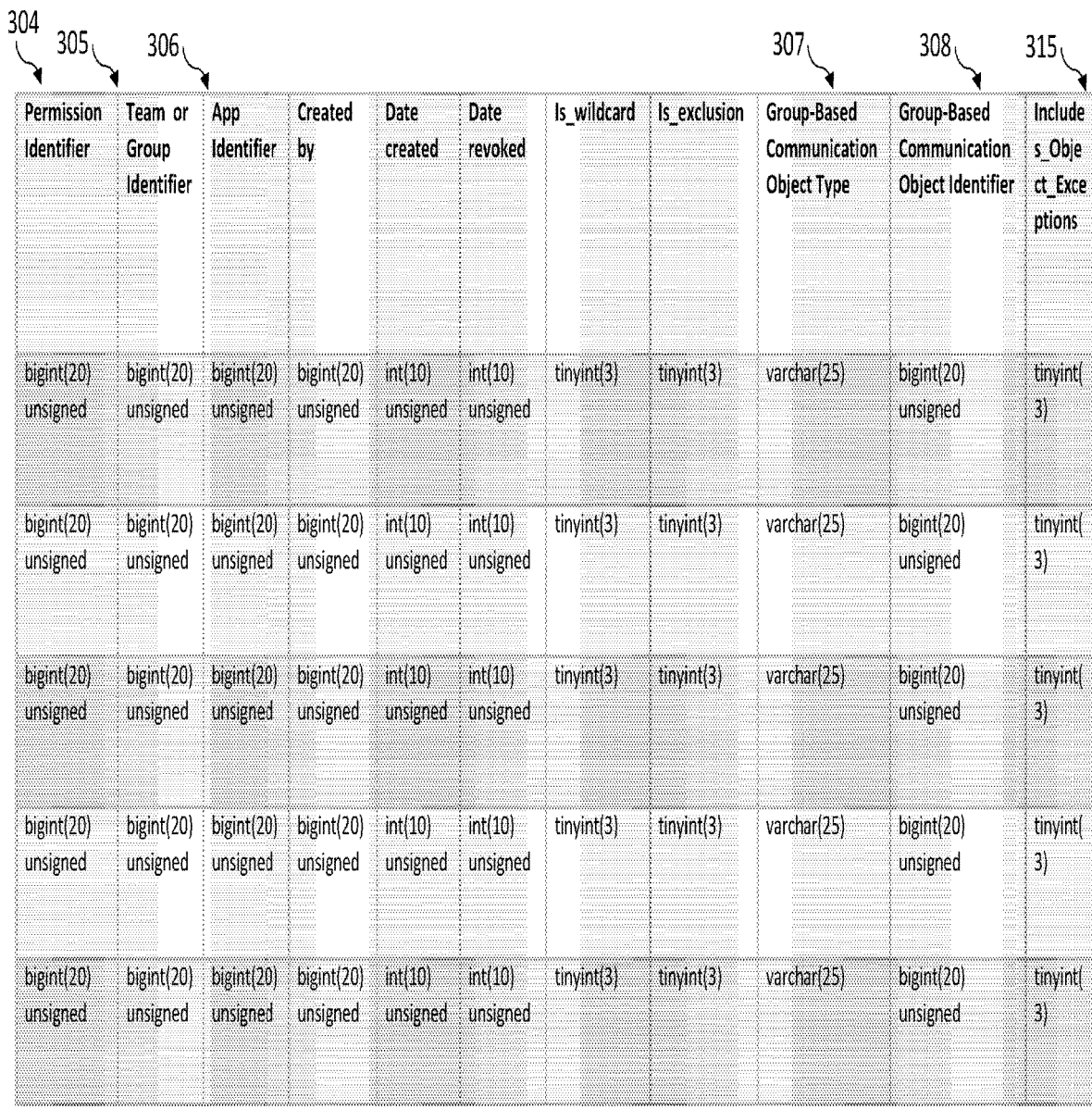
Figure 3D:
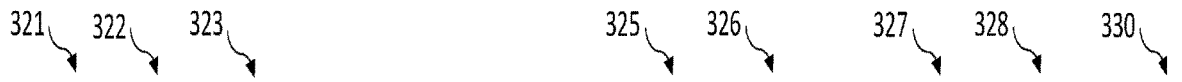
Figure 5B:
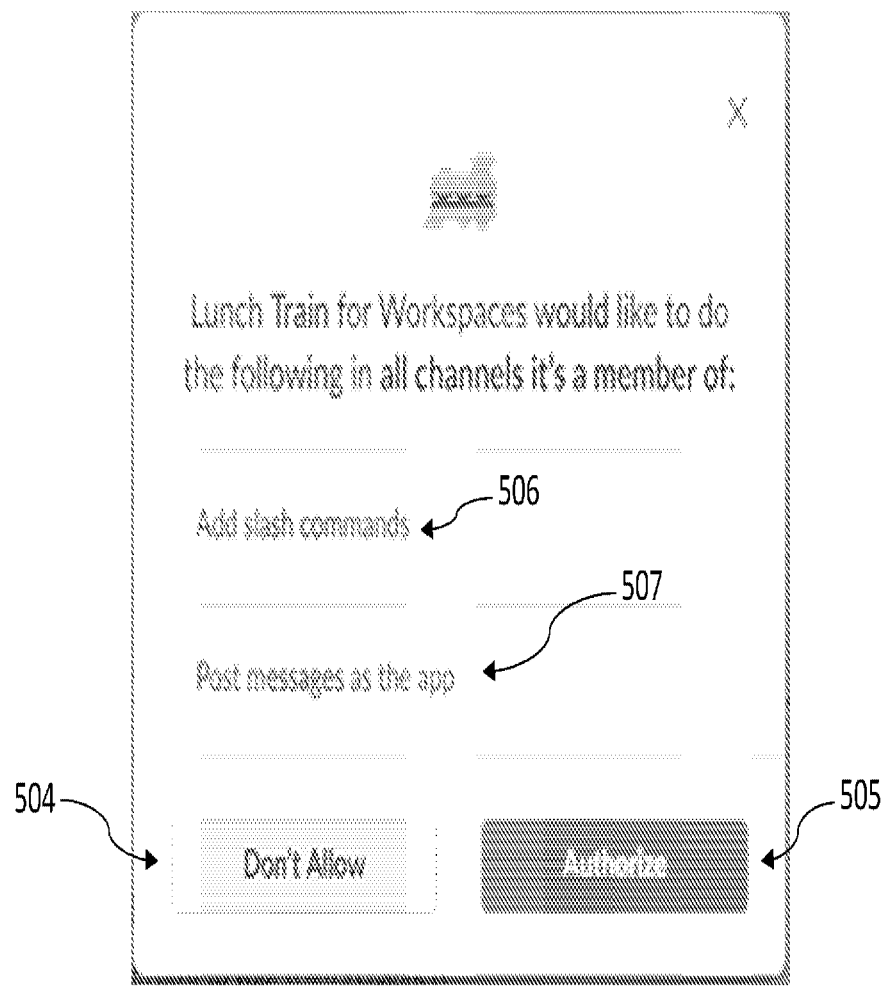
Figure 5C:
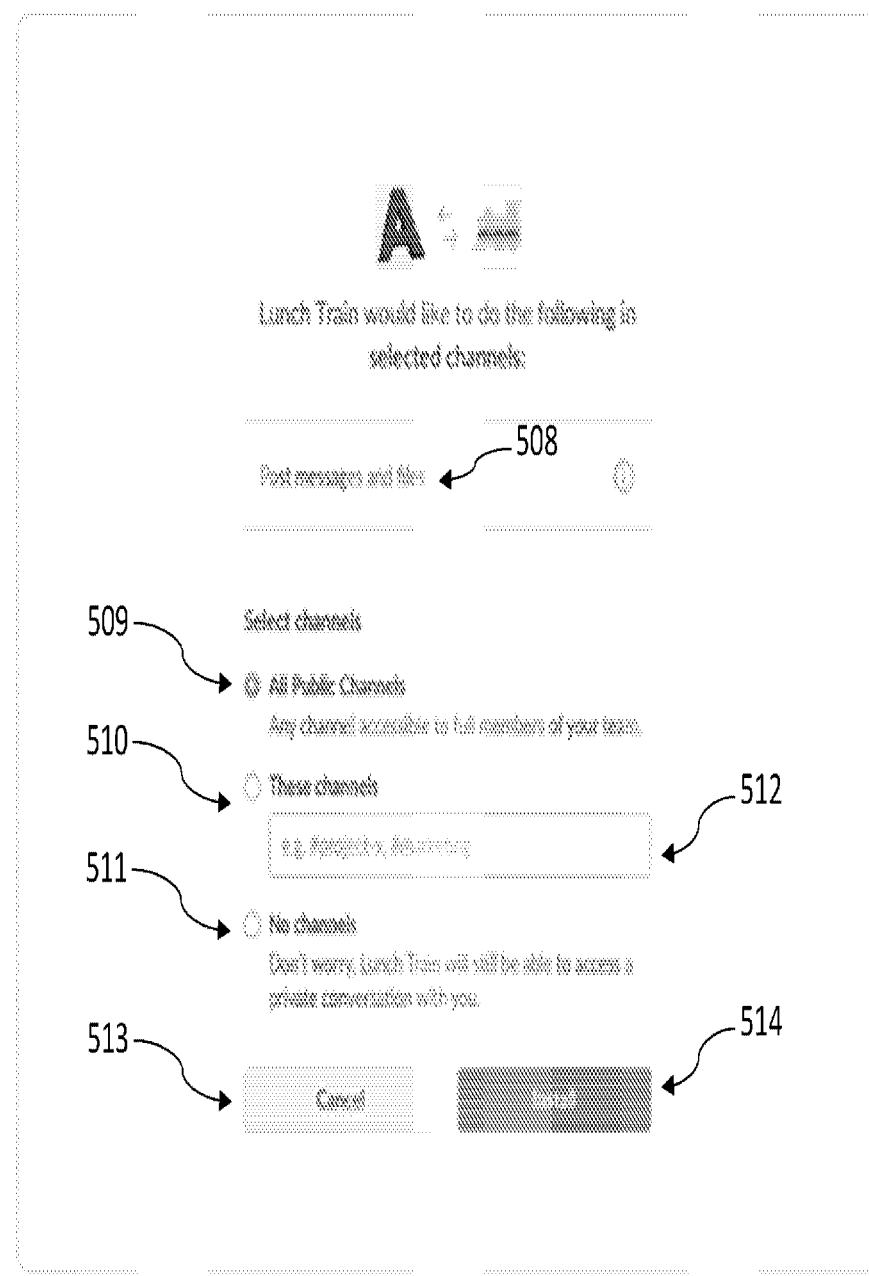
Figure 6:
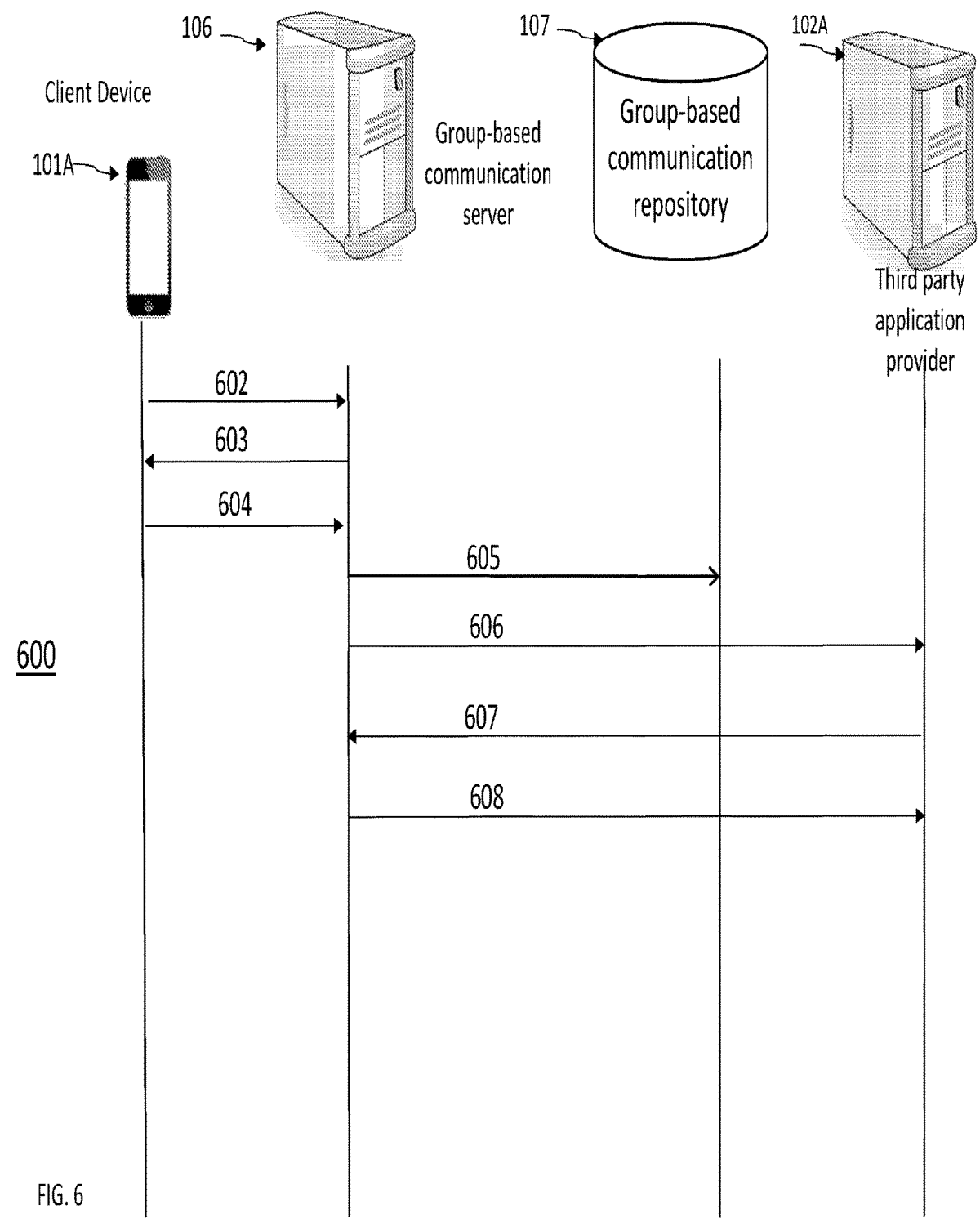
Figure 7A:
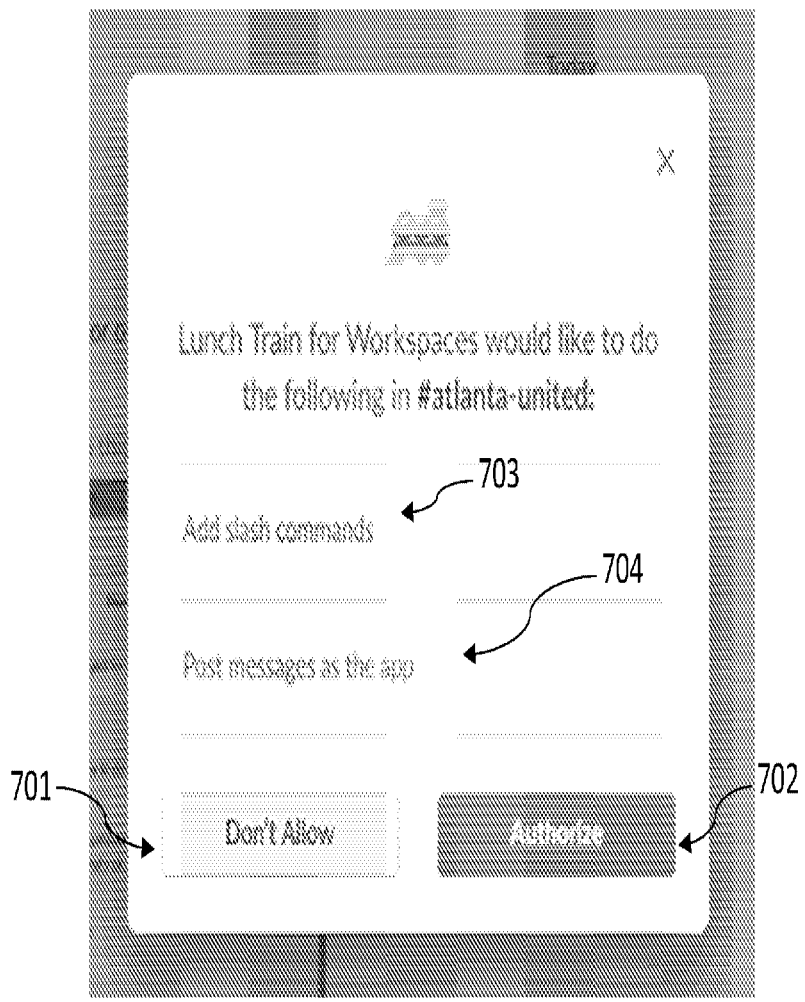
Figure 7B:
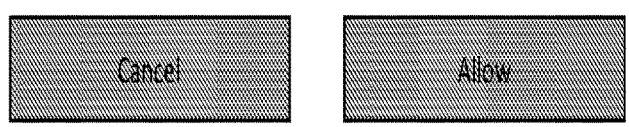
Figure 8A:
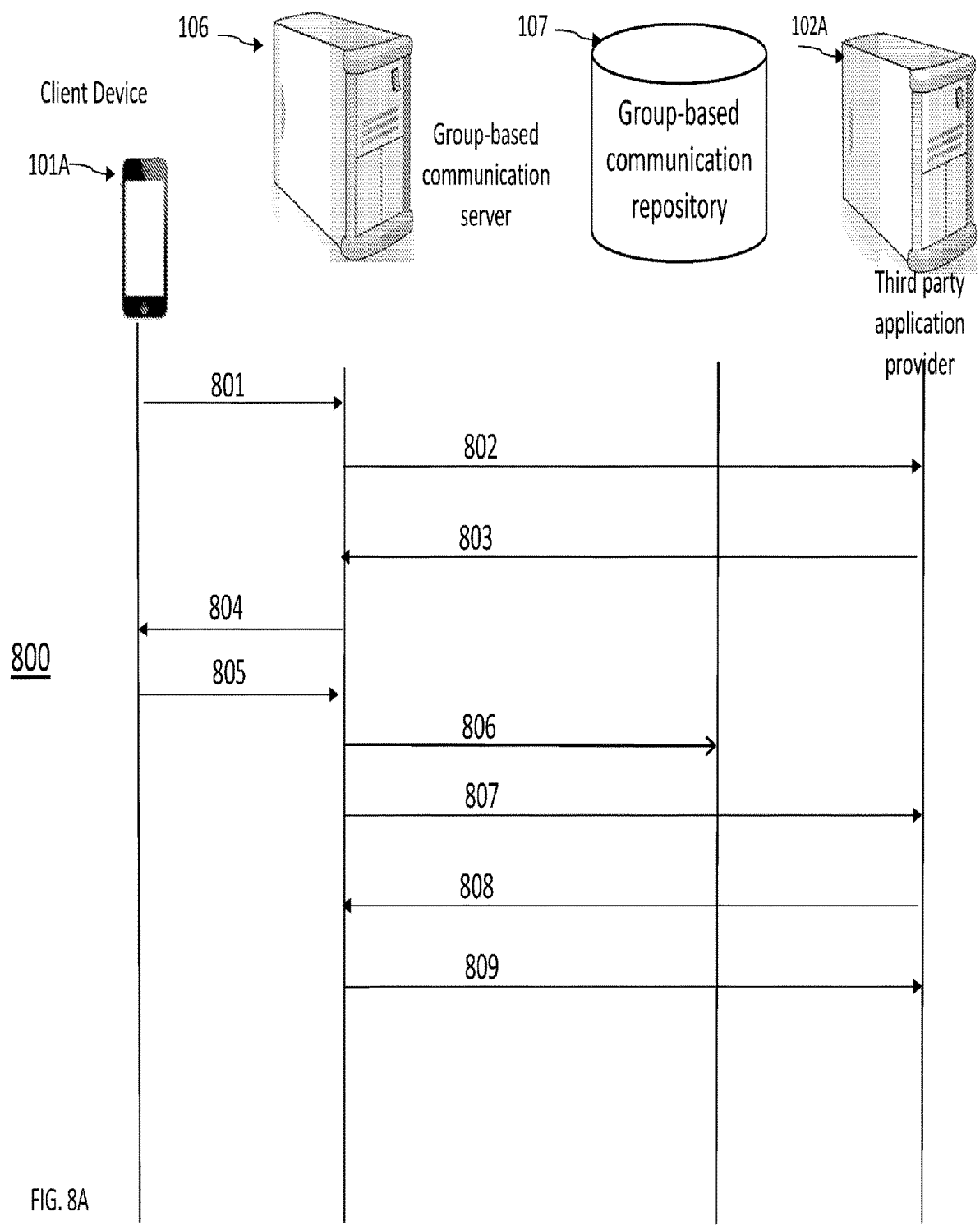
Figure 8B:
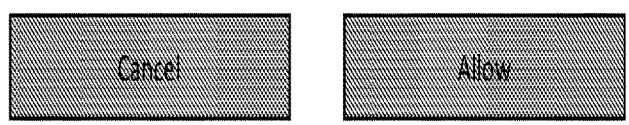

Having thus described the disclosure in general terms, reference will now be made to the accompanying drawings, which are not necessarily drawn to scale, and wherein:

FIG. 1 is a system architecture diagram of a group based communication system configured to practice embodiments of the present disclosure;

FIG. 2 is an exemplary schematic diagram of a computing entity according to one embodiment of the present disclosure;

FIG. 3A illustrates an exemplary embodiment of a group-based communication repository;

FIG. 3B illustrates an exemplary data table representing a permissions table within a group-based communication repository;

FIG. 3C illustrates an exemplary data table representing an app token within a group-based communication repository;

FIG. 3D illustrates an exemplary data table representing an object exceptions table within a group-based communication repository;

FIGS. 4A-D illustrate signal diagrams describing the process of installing a third party application within the group-based communication system;

FIGS. 5A-C illustrate various exemplary embodiments of a group-based communication object permissions interface;

FIG. 6 is a signal diagram illustrating the process of adding a third party application to a new group-based communication object in the group-based communication system FIG. 7A illustrates additional exemplary embodiments of a group-based communication object permissions interface;

FIG. 7B illustrates an exemplary embodiment of a group-based communication permissions interface;

FIG. 8A is a signal diagram illustrating the process employed by a third party application to progressively request additional permissions;

FIG. 8B illustrates an exemplary embodiment of a permissions update interface;

FIGS. 9A-I illustrate various tabs and features of an App DM;

FIGS. 10-17 illustrate flow diagrams implementing various embodiments of the present invention.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII (American Standard Code for Information Interchange) text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

As used herein, the term "third party application" refers to a software program, platform, or service that is configured to perform functions within the group-based communication system. The third party application may be integrated in a group within a group-based communication system via an app user. For example, a third party application may be a Software as a Service (SaaS) product or an Application (App) product that is provided by a third party application provider and which is stored and maintained by a third party application provider. In such an example, a client device accessing the group-based communication system may access the SaaS or App product via a group that a user of the client device is associated with.

As used herein, the term "third party application provider" refers to a provider of a third party application by way of a remote networked device, such as a server or processing device, maintained by a third party individual, company, or organization. A client device in a group-based communication system may access a third party application provided by the third party application provider to execute functions, flows, or actions. In some embodiments, the functions, flows, or actions produce an effect within the group-based communication system such as, for example, by manipulating data within the group-based communication system or posting messages within the group-based communication system, or executing some other action such as providing content to the group-based communication system for rendering in a group-based communication interface. In other embodiments, the functions, flows, or actions take effect within the third party application provider to produce an effect within the third party application provider. In yet other embodiments, the functions, flows, or actions produce effects within various combinations of the group-based communication system, the third party application provider, and other servers or systems.

For example, to provide further clarity and context, a third party application, via its associated app user account within the group-based communication system, obtains access to group-based communication objects in the group-based communication system by requesting an app token from the group-based communication system during an installation process. Generally, to generate said app token, the group-based communication system initiates an OAuth workflow with the third party application provider and a user of the group-based communication system. Within the OAuth flow, the remote networked device associated with the third party application provider obtains authorization from a user of the group-based communication system to install the third party application provided by the third party application provider. The group-based communication server in response to receiving the user authorization sent by the third party application provider, then generates an app token for the third party application provider which is also stored within the group-based communication system. The third party application provider may utilize the app token to grant to a third party application access to various group-based communication objects within the group-based communication system. A third party application provider may be a Software as a Service (SaaS) product provider or an Application (App) product provider that provides a SaaS or App product.

As used herein, the term "third party application provider identifier" refers to one or more items of data by which a third party application provider that provides a third party application in a group-based communication system may be identified. For example a third party application provider identifier may comprise ASCII text, a pointer, a memory address, and the like.

As used herein, the terms "app user account" and "app user" refer to a data structure within the group-based communications system that is configured to represent and is associated with a third party application. Further, the app user account is the means through which a third party application may access group-based communication objects and take actions with respect to those group-based communication objects. The app user account includes an application identifier, which associates the app user account to a single app token that also includes the same application identifier.

The group-based communication system creates one app user account per installation of a third party application within the group-based communication system. In some embodiments, the group-based communication system creates only one app user account that is shared among all the users who belong to a group. To that end, the app user account also includes a group identifier, which associates the app user account with the particular group associated with the group identifier. Thus, during installation of a third party application onto a group, the group-based communication system associates an app user account with the group identifier.

When an app user account and a group-based communication system user both comprise the same group identifier, the group-based communication server gives to the group-based communication system user access to the app user account such that the group-based communication system user may modify or configure the app user account. In some embodiments, the ability to access and modify the app user account is done via an App DM, which is further described in the definitions below. In some embodiments, the group-based communication system enables the group-based communication system user who first installs a third party application onto a group to restrict which group-based communication system users within the group can manage and configure the app user account associated with the installed third party application. In some embodiments, the selection of users who have access to the app user account is done via an App DM.

In some embodiments, the app user account further comprises a variable, such as, for example, an "is_app_user" variable. The is_app_user variable may be embodied as a Boolean variable, a variable utilizing a three-value logic, or any other data type suitable to store states or logical bits. When the is_app_user variable stores a certain value, the group-based communication system may utilize that value to confer properties upon the app user account that are different from the properties generally conferred upon other user accounts. For example, in some embodiments, the group-based communication system does not allow the app user account to gain access to group-based communication channels like other group-based communication users can. In other words, an app user account may not join a group-based communication channel or become a member of the group-based communication channel and gain permissions with regards to the group-based communication channel in the same manner that group-based communication system users can. Instead, the group-based communication system restricts the access of an app user account with respect to group-based communication channels and other group-based communication objects to only the access permitted by group-based communication system users as will be explained in the detailed section of this disclosure.

As a further example, in some embodiments, when the is_app_user variable stores a certain value, the group-based communication system does not allow any user to log into the group-based communication system via the app user account. That is, at the log-in URI (Uniform Resource Identifier), the group-based communication system does not accept the credentials of an app user account as the credentials with which a group-based communication user may access the group-based communication system. No group-based communication user may log into the system using the app user account because an app user account is not a user account as defined above.

Finally, each app user account has an app token associated with it; the app token is generated by the group-based communication system upon installation of a third party application. The app token is further described in the definition provided below. After installation, an app user account may be added to various group-based objects of the group-based communication system by granting to the app user account various permissions to access one or more group-based objects.

As used herein, the term "app user identifier" refers to one or more items of data by which an app user account within a group-based communication system may be identified. For example, an app user identifier may comprise ASCII text, a pointer, a memory address, and the like.

As used herein, the term "app token" refers to a set of credentials associated with an app user account which the group-based communication system may utilize to authenticate the identity of a third party application and grant to the third party application permissions in the group-based communication system. The app token includes information specifying the permissions associated with a third party application To provide clarity and context, in one exemplary embodiment, an app token includes a cryptic string uniquely generated for each third party application. An authorization module within the group-based communication system issues the app token to a third party application provider once the authorization module receives an authorization signal indicating that a user of a client device has authorized the third party application to access various group-based communication objects. After the initial issuing of the app token, the permissions granted to the app user account may be customized by requesting further permissions from users and modifying the permissions associated with the app token. These subsequent grants of permissions do not require a new app token be issued to the third party application provider.

As used herein, the term "object identifier" refers to one or more items of data by which group-based communication object within a group-based communication system may be identified. For example, an object identifier may comprise ASCII text, a pointer, a memory address, and the like.

As used herein, the term "object type" refers to a category of objects that have common characteristics. For example, group-based communication objects may be categorized as group-based communication channels, private group-based communication channels, private direct messages, private multi-party direct messages, groups or teams, information about teams, user accounts, group-based communication system users, group-based communication system users associated with a group identifier, emojis, menus, interactive buttons, links, other interactive elements, pictures, files and the like.

As used herein, the term "group-based communication object" refers to an object in the group-based communication system. In some embodiments, third party application are permitted to perform actions on one or more group-based communication objects. Each group-based communication object has an object identifier—uniquely identifies a particular group-based communication object in the group-based communication system—and an object type—describes the category of objects to which the group-based communication object belongs.

As used herein, the term "group-based communication action" refers to the actions that a third party application may take with respect to a group-based communication object. Group-based communication actions may comprise, for example, posting messages, reading messages, modifying messages, accessing information about messages, accessing content-such as files, emojis, interactive elements and the like-within messages, creating a one-way webhook to post messages to a specific channel, viewing URLs in messages, modifying a user profile, adding commands to a workspace, accessing files and associated information, confirming a user's identity, and the like.

As used herein, the term "permission" refers to (a) a group-based communication object within the group-based communication system to which a third party application has access and (2) a group-based communication action which defines an action that a third party application may take with respect to such group-based communication object. In some embodiments, the permissions granted to a third party application are stored and mapped to each other via a group-based communication repository 107.

As used herein, the term "candidate group-based communication object set" refers to all group-based communication objects available to all the users belonging to a group of users that share a common group identifier. Even if some of the group-based communication objects are available to some users of the group but not others, those group-based communication objects comprise the candidate group-based communication object set.

As used herein, the term "candidate group-based communication action set" refers to all group-based communication actions that are potentially available for a given group-based communication object. In other words, the candidate group-based communication actions are the actions that a group-based communication system could enable a third party application to take on a group-based communication object. For example, in some embodiments, a third party application, via the app user account associated with it, could potentially be granted the ability to access messages, post messages, and access all content-such as files, emojis and the like in a group-based communication channel. Thus, reading messages, writing messages, and accessing content in a group-based communication channel comprise the candidate group-based communication action set. As an added example, in some embodiments, a third party application, via the app user account associated with it, could potentially be granted the ability to access basic information about the groups associated with a user account, change the groups associated with a user account, access the profile and the elements in a profile of a user account, modify the profile associated with user account, access information in a profile in a user account, view e-mail addresses of other users associated with the group with which a user account is associated, and modify information in a profile associated with a user account. Those possible actions regarding a user account comprise the candidate group-based communication action set with respect to the user account, which is the group-based communication object.

As used herein, the term "permitted group-based communication object set" refers to the set of group-based communication objects that an app user account has access to. These permitted group-based objects are configurable by users that may add or grant additional permissions to an app user account (and thus the third party application associated with such app user account). In one embodiment, a record of the permitted group-based objects set of an app user account is stored in a group-based communication repository.

As used herein, the term "permitted group-based communication action set" refers to the set of those group-based communication actions that an app user is allowed to take with respect to a permitted group-based communication object. This set of permitted group-based communication actions are configurable by users who may add permissions for an app user account. A record of the permitted group-based communication action set of an app user is stored in a group-based communication repository.

As used herein, the term "group-based communication scope" refers to a pairing of (a) an object type and (b) a group-based communication action. In this manner, the group-based communication scope defines a group-based communication action and an associated object type of the group-based communication system. For example, to provide context, granting a permission to a third party application may comprise granting a group-based communication scope to the third party application. In this manner, the third party application may perform the group-based communication action (defined by the group-based communication scope) on group-based communication objects that are (i) included in the permitted group-based communication object set of the third party application and (ii) categorized as the object type specified by the group-based communication scope. In this example, the third party application may only perform the group-based communication action on those group-based communication objects that are categorized as the object type specified in the group-based communication scope.

As used herein, the term "permissions table" refers to a data structure storing the permitted group-based communication object set. The permissions table further associates the permitted group-based communication object set to a third party application. As an example, the permissions table stores and associates with each other an app identifier that uniquely identifies a third party application, a group-based communication object identifier that uniquely identifies a particular group-based communication object in the group-based communication system, a group-based communication object type descriptor that identifies the general type (for example, whether the type is a group-based communication channel, a group-based communication user, a private group-based communication channel, a file, an emoji, etc.) of the group-based communication object identified by the group-based communication object identifier, a group identifier that uniquely identifies a group in the group-based communication system, and a permission identifier that uniquely identifies the permission associated with the stored group-based communication object.

For example, in one embodiment, the permissions table is generated by a group-based communication server, which stores the permissions table in a group-based communications repository. In some embodiments, the group-based communication system may maintain only one permissions table per group. There, the permissions table is associated with the group via its group identifier and, thus the permissions table includes all the mapping associations between group-based communication objects within the group and a third party application having permissions with regards to the group-based communication objects.

As used herein, the term "group-based communication object permissions interface" refers to an electronic notification generated by the group-based communication system that, when rendered for display on a display screen of a client device, provides a user of a client device with the ability to grant permissions for an app user account. In some embodiments, the group-based communication object permissions interface allows the user to select with granularity the group-based communication objects and the group-based communication actions to be included in the permissions of a third party application. In other embodiments, the object permissions interface only allows users to grant or deny a pre-defined set of group-based communication objects or actions (and thus, the user may not select the group-based communication objects or actions from among a plurality of choices). In one example, a group-based communication object permissions interface may provide an indication to a user of a client device that a third party application is requesting access to a group-based communication channel, and the group-based communication object permissions interface provides the option to either grant access or deny access to such group-based communication channel.

As used herein, the term "permissions update interface" refers to a specific type of interactive interface generated by the group-based communication system that, when rendered for display on a display screen of a client device, provides a user of a client device with the ability to modify permissions related to group-based communication objects in a permitted group-based communication object set and/or permitted group-based communication actions in a permitted group-based communication action set. In general, the permissions update interface enables a user to update permissions for a third party application by enabling the user to selectively choose among available group-based communication objects and group-based communication actions.

As used herein, the term "third party application identifier" refers to one or more items of data by which a third party resource within a group-based communication system may be identified. For example, a third party resource identifier may comprise ASCII text, a pointer, a memory address, and the like.

As used herein, the term "trigger identifier" refers to one or more items that identifies an interaction between two objects in the group-based communication system. The trigger identifier may be, for example, a pointer containing information regarding an interaction such as the participants of the interaction, the time of the interaction, the location of the interaction, and the like. The trigger identifier may instead or additionally comprise ASCII text, a pointer, memory address, and the like. In some embodiments, the trigger identifier may be valid for a limited amount of time after the group-based communication system creates it.

As used herein, the term "authorization grant" refers to a signal that the group-based communication server generates in response to receiving a signal from a client device indicating that a user has selected to grant a request. An authorization grant signal may be represented via a temporary code that notifies a recipient that a user has authorized a request. For example, in some embodiments, the group-based communication server utilizes the authorization grant as part of an OAuth 2.0 flow to issue an app token to a third party application provider.

As used herein, the term "App DM" refers to a group-based communication interface that is associated with an app user account and is configured to facilitate communications between a permitted or originating user and a third party application or a third party application provider that is associated with the app user account. The App DM is configured for restricted access such that it is not generally accessible and/or searchable by other members of the group-based communication system. Each App DM is associated with only one third party application (e.g., the App DM identifier for the App DM is associated with the app user account of a third party application after the third party application has been validated/authenticated).

For example, in some embodiments, the group-based communication server may provide a number N of App DM's for a number N of group-based communication system users. In these embodiments, each of the N users may access only one such App DM. In these embodiments, all N group-based communication system users may be permitted to re-configure the app user account such that they can update the permissions provided to the app user account. In a variation of these embodiments, a subset consisting of N–X users may be permitted to re-configure the app user account such that only subset of N–X users may update the permissions provided to the app user account. Thus, the subset consisting of the other X users who are not permitted to re-configure the app user account may access the App DM only to view permissions afforded to the app user account and communicate with the app user account as further described below. However, the subset consisting of the other X users may not update the permissions provided to the app user account.

In yet other embodiments, only one group-based communication system user has permission to access (e.g., an App DM identifier for the App DM is associated with a selected user profile after the user has been validated/authenticated as a permitted user) the App DM. This permitted user is also the only user that is permitted to re-configure the app user account (e.g., update permissions provided to the app user account). Note that in this particular embodiment, the App DM may not be accessed by more than one group-based communication system user.

In some embodiments, each App DM is additionally configured to display communications posted by the user who has access to the App DM. In this sense, an App DM comprises an App DM group-based communication channel. As a consequence of the properties of the App DM, the messages posted in the App DM are only viewable to the user who has permission to access the App DM, the third party application associated with the App DM, and the third party application provider associated with the App DM. In some embodiments, the App DM is additionally configured to display communications posted to the App DM by the third party application associated with the App DM.

In some embodiments, the group-based communication server may render the App DM as an interactive interface displayed on a display screen of a client device being used by a group-based communication system user. The group-based communication server displays the App DM interactive interface as a tabbed document interface, wherein each tab provides a different functionality and/or access to different features of the App DM. In one such embodiment, for example, one tab of the App DM may provide access to a record or history of the messages exchanged between a user and the third party application. In this embodiment, another tab may provide a graphical representation of the configuration of the third party application and/or the app user account associated with the third party application such as by displaying a candidate group-based communication object set, permitted group-based communication object set, candidate group-based communication action set, permitted group-based communication action set, URI of the third-party application provider associated with the third party application, and the like. In some embodiments, the same tab may enable the user to modify the configuration and/or permissions of the third party application and/or app user account. In some embodiments, a different tab may enable the user to modify the configuration and/or permissions of the third party application and/or app user account.

As used herein, the term "App DM object" refers to a group-based communication object that is associated with only one app user account (and thus only one third party application) and a user. The App DM object includes, or has access to, instructions in the form of computer code that may be used by the group-based communication system and a group-based communication client to render an App DM on a display screen. In addition, the App DM object includes, or has access to, the instructions and data structures that implement the functions of the App DM. For example, those instructions or data structures include information regarding which users are allowed to configure the permissions of the app user account associated with the App DM object. The App DM object also provides for a virtual communications feeds configured to display messaging communications posted by the user and the third party application associated with the app user account that, in turn, is associated with the App DM object. In that sense, the App DM object comprises an App DM group-based communication channel. The virtual communication feeds is accessible by only one user of the group-based communication system. Thus, the App DM object is configured to provide one separate and private virtual communications feed for each user of a group, and such feed is accessible only by the corresponding user of the group and the third party application associated with the App DM object. However, note that any given third party application may have access to a plurality of App DM objects.

Further, the App DM object may be included within a permitted group-based communication object set such that a third party application may be afforded permitted group-based communication actions with regards to the App DM object. For example, a third party application may be permitted to read and write in the App DM object.

In some embodiments, the data structure corresponding to the App DM object and the data/instructions required to enable operation of the App DM may be stored, maintained, and allocated in a networked device associated with the third party application provider, in the group-based communication repository, in the client device used by the user who has access to the App DM object or, alternatively, in any combination of these three.

As used herein, the term "channel object set" refers to all the group-based communication objects associated with a particular group-based communication channel. In this manner, each of the group-based communication objects share a common channel identifier. Typically, the channel object set would include those group-based communication objects accessible by a user via a channel. For example, the channel object set could include, for example, files, emojis, links, users, app user accounts, and any other group-based communication object that could populate or be associated with a group-based communication channel.

Overview

Various embodiments of the present disclosure generally relate to a method for selectively granting to third party applications access to group-based communication objects within a group-based communication system. The embodiments give users control over the group-based communication objects that a third party application may access. Further, they give users control over the actions that a third party application may take with regards to those group-based communication objects.

The various embodiments also provide for an efficient method for integrating a third party application within a group-based communication system. The third party application is installed onto a group, comprising a plurality of users that have a common group identifier, such that every user that belongs to that group also owns, has access, and may modify the permissions granted to the third party application. In some variations of the system, for practical reasons, only a subset of the plurality of users that have the common group identifier has access and may modify the permissions granted to the third party application. However, even in this variation, the plurality of users that have the common group identifier have access to and may utilize the third party application.

In this manner, the various embodiments provide for an improved group-based communication system. For example, previous methods of integrating a third party application in a system, such as the group-based communication system disclosed here, may have consisted of granting to a third party application access to all group-based communication objects accessible to a user or a group within the system. The disclosed embodiments, however, enable a user to limit the access of a third party application to only those group-based communication objects selected and allowed by the user. Thus, the group-based communication system provides users with granular control over the group-based communication objects that are accessible to third party applications. In another aspect, previous methods may have consisted of granting to a third party application the ability to perform all possible candidate group-based communication actions on the group-based communication objects accessible to the third party application. In contrast, the disclosed embodiments provide an improvement in that they enable a user to limit the types of actions, i.e. the permitted group-based communication action set, that a third party application may take with regards to the permitted group-based communication object set, which are accessible to the third party application.

In another aspect of the various embodiments, a user may grant permissions to a third party application in a progressive manner by authorizing additions or modifications to the permitted group-based communication object set and associated permitted group-based communication action set of the third party application. Because the modification of these permissions does not require a new app token, the various embodiments disclosed provide for an efficient integration of a third party application into the group-based communication system. The benefits conferred by these described features include at least, and without limitation, a more user-friendly group-based communication system that allows each user in a group to tailor the types of actions that a third party application may take within the group. This is the result of, at least, the ability of the system to grant additional permissions to a third party application without requiring the end-users to re-authenticate the third party application. This ultimately increases the flexibility and customization of the user experience while utilizing the group-based communication system.

Finally, the various embodiments disclosed provide for an efficient method of installing and removing a third party application from a group-based communication system because the third party application is installed at the group level. This is advantageous over a framework in which the third party application is installed at the user level. For example, in previous methods, each user interested in utilizing the functionalities associated with a third party application was required to request an installation of a third party application; this required a new authentication process and a new token for each user installation. In contrast, the disclosed embodiments provide an improvement because they reduce the number of tokens required to authenticate the identity of a third party application and the number of authenticating flows required to integrate the third party application in the group based communication system.

As another example, in previous methods, associating a third party application to a user account caused instabilities and design challenges related to instances in which the user account was removed from a group or deleted from the system. In contrast, the disclosed embodiments provide a more robust group-based communication system because applications are installed at the group level. This feature insulates the third party application and its associated app user account from additions and removals of group-based communication users. Thus, one of the benefits realized by the disclosed invention includes at least, and without limitation, a more stable system which is also friendly to application developers and third party application providers as a result of the reduced number of data structures and functions that are required to integrate a third party application into the group-based communication system and as a result of associating third party applications with groups as opposed to users.

A final and natural consequence of the advantageous improvements and embodiments described herein is a more efficient data network and group-based communication system. In other words, a consequence of the reduced amount of data to be generated and transmitted over the network, which is a natural consequence from the reduced number of tokens and authorization flows required to implement third-party-application integration within the group-based communication system, the invention provides for increased efficiency and throughput of relevant electronic data via the network supporting the group-based communication system. Further, other functions implemented within the group-based communication system, which may be necessary for the core operation of the system, may be executed at a faster rate because of the reduced number of authentication flows required when integrating third party applications within the group-based communication system. Another consequence of the disclosed invention is that the group-based communication system enables an implementation of a group-based communication system that maintains the same performance results while lowering the infrastructure requirements for its implementation. This, again, is a consequence of the reduced number of data structures and flows required to integrate third party applications. The invention disclosed herein may be applicable to other systems requiring tokens and authentication to integrate third party applications and, thus, the solutions provided in this disclosure may be employed to obtain more efficient systems and data networks.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present invention may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android©, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via at least one application program interface (API) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
```

```
    <app_installed_flag>true</app_installed_flag>
    <app_name> </app_name>
    <app_version>1.0 </app_version>
    <app_webkit_name>Mobile Safari</client_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier> ID_team_1</team_identifier>
    <channel_identifier>ID_channel_1</channel_identifier>
    <contents>That is an interesting invention. I have attached a copy our
patent policy.</contents>
    <attachments>patent_policy.pdf</attachments>
</message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP i.e. the script language derived from Personal Home Page Tools-commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Group-Based Communication Repository

Now with reference to FIGS. 3A-D, group-based communication repository 107 comprises permissions table 301, app tokens table 302, and an object exceptions table 303 that is optional. Each app user account of the group-based communication system 105 has information stored in the permissions table 301 and app tokens table 302. Optionally, each app user account may also have information stored in the object exceptions table 303. Thus, each app user account of the group-based communication system 105 may have database table entries in permissions table 301, app tokens table 302, and, optionally (if included in the embodiment), object exceptions table 303. As shown in FIG. 3B, in some embodiments, permissions table 301 includes, among other data, a permission identifier 304, a group identifier 305, an app identifier 306, a group-based communication object type descriptor 307, a group-based communication object identifier 308, and a Boolean variable includes_object_exceptions 315. As shown in FIG. 3C, app tokens table 302 includes, among other data, an app token permission identifier 309, an app user identifier 311, a group identifier 310, an app identifier 314, a group-based communication scope descriptor 313, and a cryptic string 312. As shown in FIG. 3D, the object exceptions table 303, which is optional and is included only in some embodiments, includes a permission identifier 321, a group identifier 322, an app identifier 323, a group-based communication object type 325, a group-based communication object identifier 326, an excluded object type 327, an excluded object identifier 328, and an excluded group-based communication scope 330.

Note that row entries in the three tables, 301-303, would be associated with the same third party application only if app identifiers 306, 314, and 323 are identical to each other.

The app identifiers 306, 314, and 323, include data that uniquely identifies a third party application in the group-based communication system. Similarly, row entries in the three tables, 301-303, would be associated with the same third party application only if group identifiers 305, 310, and 322 are identical to each other. The group identifiers 305, 310, and 322, include data that uniquely identifies a group that may include a plurality of users as its members (they would also in turn have to be associated to the group via the same group identifier). These same principles apply to permission identifiers, 304 and 321, and group-based communication object identifiers, 308 and 326; that is, two row entries would be associated with the same permission identifier or group-based communication object identifier only if the values held by those identifiers are identical across row entries.

Permissions table 301 includes various data fields that are important to the implementation of selectively granting permissions to third party applications in the group-based communication system 105. Permission identifier 304 uniquely identifies a permission that is related to a particular entry within the permissions table. Group-based communication object identifier 308 specifies a specific object in the group-based communication system 105 associated with the permission identifier. Group-based communication object type 307 specifies the object type of the group-based communication object associated with the permission identifier. App identifier 306 uniquely identifies the third party application associated with the permission identifier. In this manner, each row in FIG. 3B provides a mapping between a group-based communication object, its object type, a group, and a third party application that has permissions with regards to the group-based communication object. In some embodiments, the group-based communication server updates the permissions associated with a third party application partly by modifying the permissions table so as to associate (i.e. add a mapping for) a new group-based communication object to a third party application.

App tokens are stored in the group-based communication repository 107 via data structure such as an app tokens table 302 shown in FIG. 3C. In some embodiments, the group-based communication repository 107 includes a single app tokens table 302 that stores the relevant data for all the app tokens generated by the group-based communication system 105. In these embodiments, the group-based communication system 105 may determine what app token each table entry is associated with via the app token identifiers 309. In these embodiments, the data defining a given app token comprises all the table values in app tokens table 302 that are associated with a common app token identifier 309. This embodiment is practical and a simple implementation of the app tokens because all the app tokens would be stored, maintained, and queried via a single app tokens table 302.

An ordinarily skilled artisan could envision other embodiments where the group-based communication repository 107 stores a separate app tokens table 302 for each separate app token. This embodiment would require that the group-based communication repository 107 store a plurality of app tokens tables (one for each app token) similar to app tokens table 302. However, a possible benefit of this embodiment would include a smaller quantity of values (e.g. rows) to be stored in any given app tokens table. An ordinarily skilled artisan would recognize that this embodiment involves some tradeoffs. For example, the embodiment would include a more complicated method for generating the app tokens table and querying each of the plurality of app tokens tables. On the other hand, the embodiment could also reduce the processing time of each table query because the size of each app tokens table would be smaller than in the previous embodiment, which would store all app tokens in one single app tokens table 302.

The app tokens table 302, in other embodiments, could also be represented via an array, a tree, or any such similar data structure, and not necessarily a table.

In some embodiments, the group-based communication server 106 uses the cryptic string 312 of the app token to verify the identity of a third party application before granting the third party application access to group-based communication objects and actions. To that effect, each app token includes an app identifier 314, which uniquely identifies an app user, and a group identifier 310, which uniquely identifies the group with which the app user is associated.

Notably, the app tokens table includes a group-based communication scope descriptor 313, which holds data specifying zero (such as when its value is null) or more group-based communication scopes. Thus, the app tokens table maps a group-based communication scope to a group (via the group identifier 310, which uniquely identifies a group) and third party application (via the app identifier 314, which uniquely identifies the third party application). In this manner, the group-based communication scope descriptor 313 includes information specifying group-based communication scopes associated with an app user account that, in turn, is associated with a third party application. In some embodiments, when the group-based communication server 106 first generates the rows of an app tokens table 302 for a new app token, it may generate the rows with values already included in the group-based communication scope descriptor 313. In essence, the group-based communication scope descriptor 313 contains the group-based communication scopes granted to a third party application at installation.

In other words, upon generating the new app token, the group-based communication server 106 automatically grants to a third party application the group-based communication scopes specified by the values in the group-based communication scope descriptor 313. Further, in one embodiment, these initially instantiated group-based communication scopes (i.e. the group-based communication scopes corresponding to those specified by the group-based communication scope descriptor 313 immediately after the entries associated with an app tokens table are generated for the first time) may be uniform for every third party application. In this manner, the communication server 106 confers similar group-based communication scopes onto every third party application at the installation stage. In a specific example of this embodiment, for example, the permissions specified by the group-based communication scope descriptor 313 may consist of the ability to read, write, and access the history and contents of group-based communication objects of App DM objects (App DM object would be the object type in this particular group-based communication scope). In this embodiment, therefore, every newly installed third party application is granted, at installation, the ability to read, write, and access the history and contents of App DM objects.

In other embodiments, a new app token may be generated with no values being held by its corresponding group-based communication scope descriptor 313. In these embodiments, however, the group-based communication system 105 grants to a newly installed third party application a set of initial group-based communication scopes without referencing the group-based communication scope descriptor 313. In this manner, the group-based communication system 105 confers similar group-based communication scopes onto every newly installed third party application at installation. For example, the initial and automatic group-based communication scopes may consist of the ability to read, write, and access the history and contents of group-based communication objects of App DM objects (App DM object would be the object type in this particular group-based communication scope). In these embodiments, the group-based communication scopes descriptor 313 is reserved for storing group-based communication scopes granted to a third party application after installation. The group-based communication system 105 may thus modify the group-based communication scopes descriptor 313 at a time following installation of the third party application.

In all embodiments, however, each app user account is associated with only one app token (and its corresponding app token identifier 309). The app token associated with an app user account may be modified to effectuate an update of the permitted group-based communication action set for any given app user account. The group-based communication system implements the update via a modification of the group-based communication scope descriptor 313.

The permissions that a third party application has with regards to a group-based communication object necessarily involves a mapping between a pairing of (a) a group-based communication object and (b) a group-based communication action. Therefore, to determine a permission, the group-based communication system 105 must cross-reference the information in the permissions table 301 and the app tokens table 302. The permissions table 301 provides the group-based communication object identifier that uniquely identifies the particular group-based communication object of a permission. Additionally, the permissions table 301 provides the object type of the particular group-based communication object. On the other hand, the app tokens table 302 provides the group-based communication scope descriptor, which comprises (a) an object type, and (b) a group-based communication action that a third party may take with regards to group-based communication objects that fall under the category of the object type. In this manner, by cross-referencing the information in the two tables, 301 and 302, the group-based communication server may determine the permission that a third party application has with regards to a particular group-based communication object in the group-based communication system 105.

In the same vein, the group-based communication system 105 must reference both tables, 301 and 302, to update or modify the permissions associated with a third party application. Updating or modifying the permissions of a third party application necessarily involves modifying at least one of (a) a group-based communication object to which the third party application has access, or (b) a group-based communication action that a third party application can take with respect to the group-based communication object. Updating or modifying permissions may involve modifying both (a) and (b). To accomplish such a modification, the group-based communication system 105 must match the modification of the permissions table 301 and the modification of the app tokens table 302 to grant the intended permission to the third party application.

Regarding FIG. 3D, object exceptions table 303 enables users to specify permissions afforded to a third party application with a higher degree of granularity or specificity. Object exceptions table 303 is used to keep track of permissions related to (a) group-based communication objects that may populate or be associated with another group-based communication object and (b) the permitted group-based communication action sets related to a plurality of group-based communication objects that are categorized under the same object type. For example, a group-based communication channel may include a channel object set, which may consist of files, emojis, links, users, app user accounts, and other group-based communication objects that are accessible by a user via a group-based communication channel. The object exceptions table 303 enables the group-based communication system to grant to a third party application access and permissions to some of the group-based communication objects that comprise the channel object set. To do so, in one embodiment, the group-based communication system 105 first grants to the third party application permission to access the group-based communication channel via the permissions table 301 and app tokens table 302. Then, the group-based communication system 105 sets the includes_object_exceptions Boolean variable to "true," which would indicate that the particular group-based communication channel includes at least one exception to its permissions. Finally, the group-based communication system 105 then generates and stores values in the object exceptions table 303 to specify the exceptions to the permissions.

For example, if the group-based communication system 105 is to deny access to a group-based communication object (such as a group-based communication object in the channel object set), then the group-based communication system 105 would store the group-based communication object identifier corresponding to the excepted group-based communication object. The group-based communication system 105 would store the group-based communication object identifier in the excluded object identifier 328. Additionally, the group-based communication system 105 would store the object type of the excepted group-based communication object in the excluded object type 327. In this manner, the group-based communication system 105 excludes, from the permissions associated with a third party application (corresponding to the app identifier 323), the group-based communication object corresponding to the excluded object identifier 328.

As another example, in the case that the group-based communication system 105 is to restrict the actions that a third party application may take within a group-based communication object, then the group-based communication system 105 may include the data values corresponding to the excepted group-based communication scope as the excluded group-based communication scope 330. In this manner, the group-based communication system 105 excludes, from the permissions associated with the third party application (corresponding to the app identifier 323), the group-based communication scope corresponding to the excluded group-based communication scope 330. The consequence is that the third party application may have other permissions with regards to a particular group-based communication object corresponding to group-based communication identifier 326. However, the third party application would not have the ability to perform, in relation to the group-based communication object corresponding to the value in the group-based communication identifier 326, the group-based communication action corresponding to the group-based communication scope identified by the excluded group-based communication scope 330.

Group-based communication repository 107 may also store messaging communications as well as messaging communication information. Messaging communications as well as corresponding messaging communication information may be indexed within group-based communication repository 107 by various indicators such as a group-based communication channel identifier or global identifier. Group-based communication server 106 may query group-based communication repository 107 using a user's global identifier to find messaging communications and corresponding messaging communication information associated with that user. Group-based communication server 106 may query group-based communication repository 107 using a group-based communication channel identifier to find messaging communications and corresponding messaging communication information associated with a particular group-based communication channel identifier.

Stored messaging communication information may include a timestamp corresponding to a messaging communication, an urgent indicator corresponding to a messaging communication, a has_file indicator corresponding to a messaging communication, a word count indicator corresponding to a messaging communication, a message topic corresponding to a messaging communication. Other messaging communication information may also be included in group-based communication repository 107.

Installation of an Application in a Group

The group-based communication server is configured to install a third party application in a group. In one exemplary embodiment, the installation comprises the group-based communication server implementing an authorization flow on behalf of a third party application. In some embodiments, the authorization steps may implement the OAuth 2.0 standard. In one embodiment, installing a third party application in a group comprises the general steps of (1) initiating an authorization flow on behalf of the third party application, which generates a unique app token to be associated with the app user account, (2) generating and storing in the group-based communication repository 107 an app user account associated with the third party application, and (3) generating permissions associated with the app user account, which are subsequently added to the permissions table (i.e. permissions table 301) and app tokens table (i.e. app tokens table 302) associated with the third party application being installed.

Figure 4A:
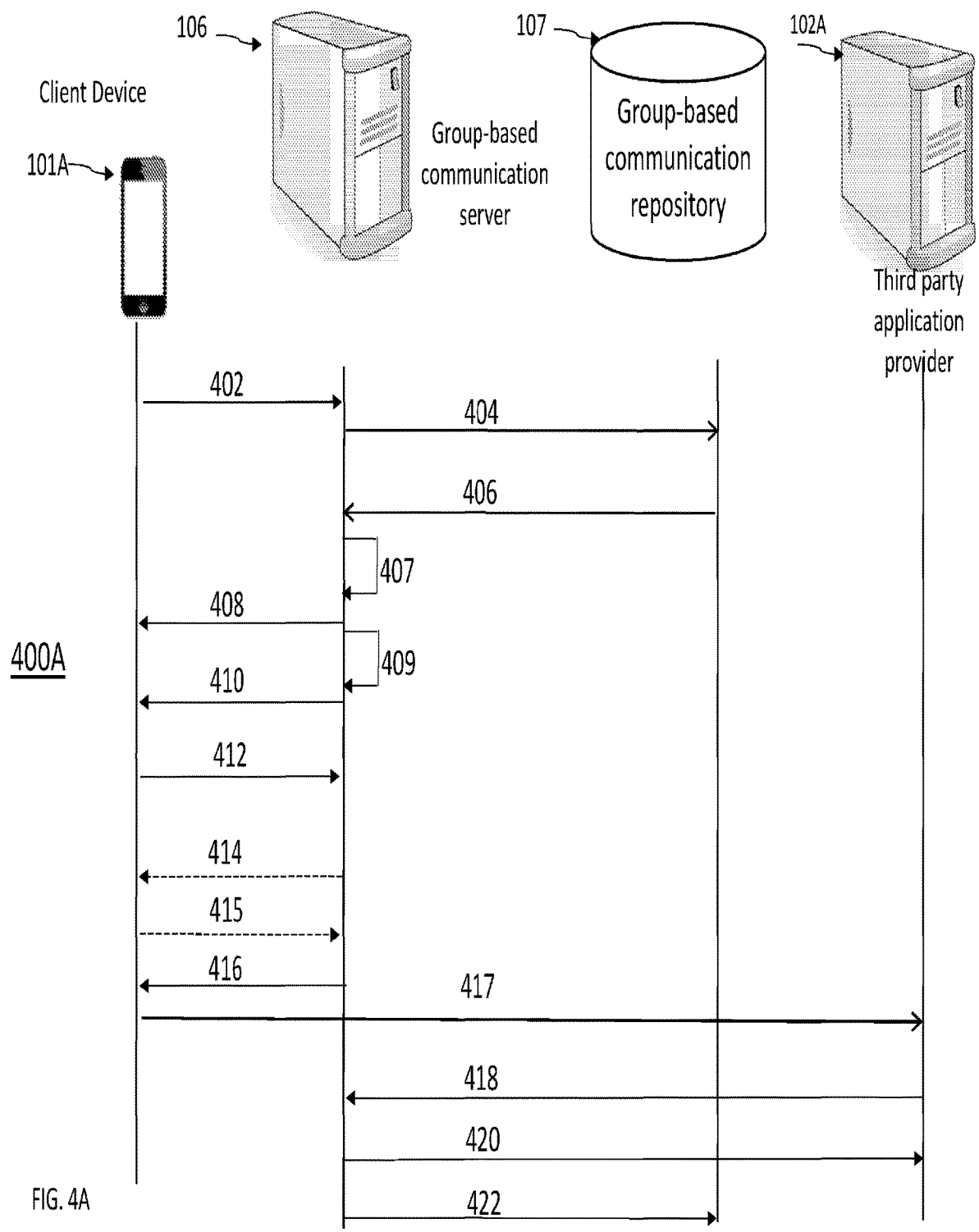
Figure 4B:
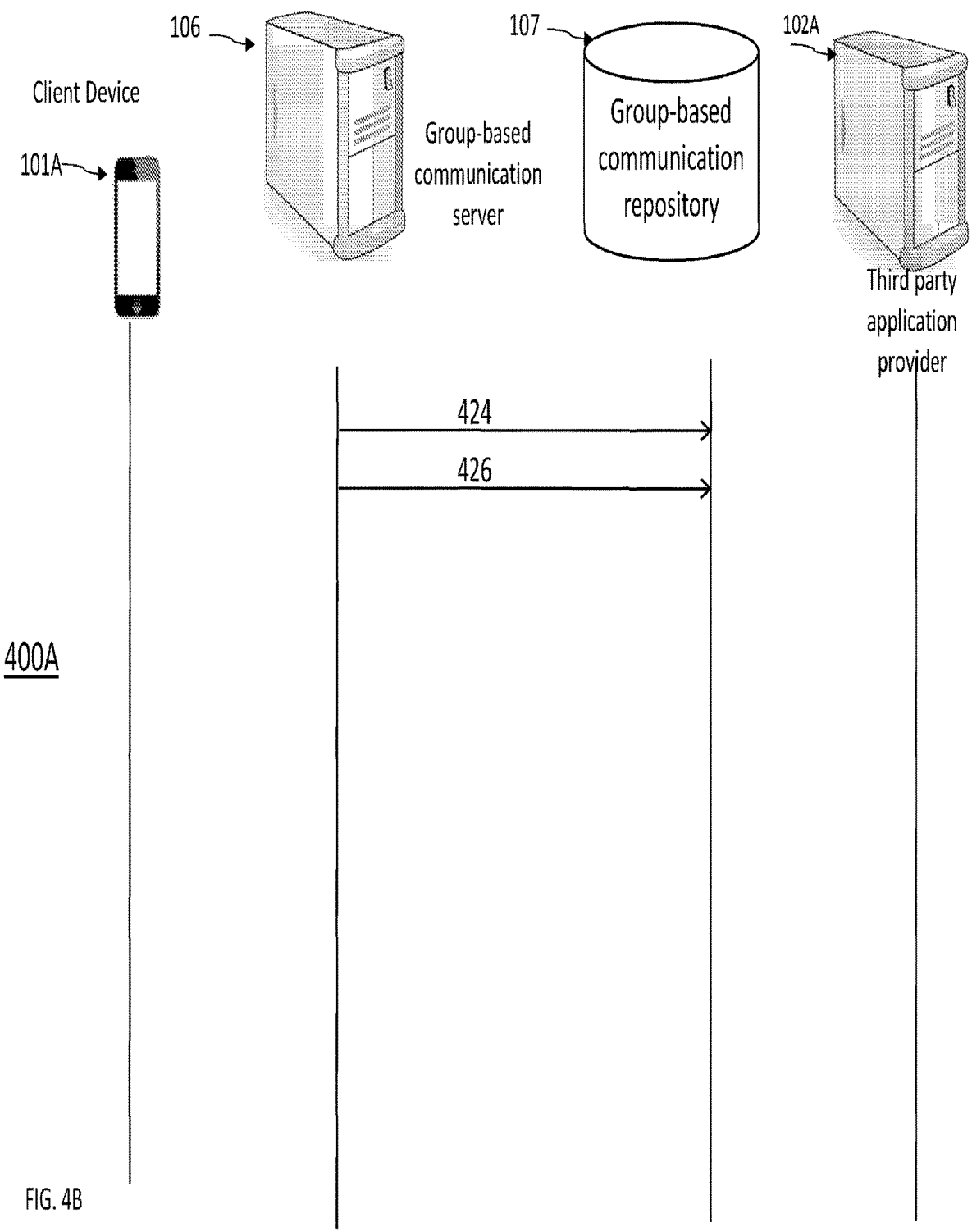

FIGS. 4A-B illustrate a signal diagram representing an embodiment of an installation procedure 400A of a third party application in a group of the group-based communication system 105. At step 402, group-based communication server 106 receives, from a client device 101A, a request to install an application to a group associated with a user of a client device 101A. In some embodiments, the group-based communication system 105 may receive such a request as a result of the user of a client device 101A clicking on an interactive button or some other type of display screen interactive element. In some embodiments, the interactive button or display screen interactive element may be provided as an element of a user interface associated with the group-based communication system 105, which could be displayed in the client device 101A. The request received by the communication server 106 may also comprise various parameters such as a third party application provider identifier, a third party application identifier, a descriptor of the permissions to be requested on behalf of the third party application, an optional URI redirect_URI—where the user of a client device should be redirected at the conclusion of the authorization and/or installation process, an optional unique state string to be transmitted upon completion of the authorization and/or installation process (the purpose of the unique state string may be to increase the security of the process such as by, for example, mitigating the transmission of unauthorized, forged signals such as during cross-site request forgery), and an optional group identifier associated with the group where the third party application is to be installed.

In some embodiments, in place of the third party identifier, the group-based communication server 106 receives a client identifier which may also identify the third party application to be installed. In some embodiments, the group-based communication server 106 may generate the client identifier during a registration process that occurs before installing the third party application for the first time (step not shown in FIG. 4A). In other words, the group-based communication server 106 may, in response to receiving a request to register a third party application, generate a client identifier and transmit the client identifier to a third party application provider 102A associated with the third party application. In addition, the group-based communication server 106 may store in the group-based communication repository 107, a record of the generated client identifier for future reference such as for reference during the installation process. In some embodiments, third party application provider 102A may also store the client identifier and use the client identifier in communications with the group-based communication server 106 to identify the third party application associated with the communications; for example, this is useful during a subsequent authorization and installation process. The client identifier, in some aspects, is analogous to a third party application identifier in that both of these identifiers are associated with a third party application. However, the client identifier is generated for a third party application provider 102A whereas the third party application identifier is generated for internal use within the group-based communication system 105.

In some embodiments, the group-based communication server 106, as part of the registration process described above, also generates a cryptic string, hereafter called a client_secret, which is associated with the third party application provider or the third party application. The group-based communication server 106 transmits the client_secret to the third party application provider 102A, which enables the third party application provider 102A to use client_secret at a subsequent authorization process. For example, the client_secret may be used by the group-based communication server 106 to authenticate a third party application or the third party application provider. Similarly to the client identifier, the group-based communication server 106 may store in the group-based communication repository 107 a record or a copy of the client_secret for future use or reference.

At step 404, the group-based communication server 106 queries the group-based communication repository 107 to confirm that the third party application is not already installed in the group corresponding to the group identifier provided by the user requesting installation. In one exemplary embodiment, the query from group-based communication server 106 searches for an app token that includes the group identifier corresponding to the group for which the requesting user is requesting installation and a third party identifier corresponding to the third party application that the user has requested to install.

At step 406, the group-based communications server 106 receives the query results from the group-based communication repository 107. Then, at step 407, the group-based communication server determines if the group-based communication repository 107 includes data indicating that the third party application has already been installed in the group corresponding to the group identifier provided by the client device. In other words, at steps 404-407, the group-based communication server 106 queries the group-based communication repository 107 to determine whether the third party application has already been installed.

In one embodiment, in response to determining at steps 404-407 that the third party application has already been installed, the group-based communication server 106 aborts the installation of the third party application. In some embodiments, the group-based communication server 106 then transmits a signal (not shown in FIG. 4A) to the client device that causes the client device to render the App DM associated with both, the user of the client device 101A and the third party application that the user attempted to install but which is already installed. In such an embodiment, the group-based communication system 105 enables the user of a client device 101A to view and configure, via the App DM, the app user account corresponding to the third party application already installed in the group-based communication system 105. In some embodiments, only if the user has been authorized access to configure the third party application, such as by the user who first installed the third party application onto the group, is the user then able to access and modify the configuration of the third party application via the App DM. In other embodiments, a user designated as an administrator, and not the user who first installed the third party application, is the user who grants other users access to configure the permissions of the third party application via the App DM.

In another embodiment, in response to determining, at steps 404-407, that the third party application has already been installed, the group-based communication server 106 then compares the current permissions of the installed third party application with the descriptor of the permissions to be requested on behalf of the third party application as specified by the received request at step 402. If the group-based communication server 106 determines that the descriptor of the permissions to be requested includes additional permissions when compared to the current permissions of the third party application, then the group-based communication server 106 advances to step 408. On the other hand, if the group-based communication server 106 determines that the descriptor of the permissions to be requested does not include additional permissions, then the group-based communication server 106 aborts the installation of the third party application. The group-based communication server 106 then transmits a signal (not shown in FIG. 4A) to the client device that causes the client device to render the App DM associated with both, the user of the client device 101A and the third party application that the user attempted to install but which is already installed. In such an embodiment, the group-based communication system 105 may enable the user of a client device 101A to view and configure the app user account corresponding to the third party application already installed in the group-based communication system 105 via an App DM. In some embodiments, only if the user has been authorized access to configure the third party application, such as by the user who first installed the third party application onto the group, is the user then able to access and modify the configuration of the third party application via the App DM. In other embodiments, a user designated as an administrator, and not the user who first installed the third party application, is the user who grants other users access to configure the permissions of the third party application via the App DM.

At step 408, the group-based communication server 106 redirects the user of a client device 101A to a URI, hosted by the group-based communication server 106 where the authorization begins. At step 409, the group-based communication server 106, in addition, transmits to the URI several of the received parameters at step 402. These are parameters required for the authorization and installation processes. Such parameters may comprise, for example, the third party application identifier or the client identifier, a descriptor of the permissions to be requested on behalf of the third party application, a URI—redirect_URI—where the user of a client device should be redirected at the conclusion of the authorization and/or installation process, a unique state string to be transmitted upon completion of the authorization and/or installation process, and a group identifier associated with the group where the third party application is to be installed.

At step 410, the group-based communication server 106 generates and transmits a signal to the client device 101A, which prompts the user to grant or deny installation of the third party application. In addition, in some embodiments, the group-based communication server 106 may prompt the user to either grant or deny to the third party application the group-based communication scopes corresponding to those specified by the group-based communication scope descriptor 313. In some embodiments, the group-based communication server 106 additionally prompts the user to either grant or deny to the third party application additional permissions or group-based communication scopes beyond those specified by the group-based communication scope descriptor 313. For example, the group-based communication server 106 may prompt the user to either grant or deny to the third party application the permissions corresponding to those specified by the descriptor of permissions to be requested on behalf of the third party application that was received at step 402. The prompt to the user of a client device 101A may be in the form of instructions from the group-based communication server 106 that, when received by the client device 101A, causes the client device 101A to render a group-based communication object permissions interface.

An exemplary embodiment of such a group-based communication object permissions interface is shown in FIG. 5A. With reference to FIG. 5A, the permission request message, 503, indicates that the group-based communication object permissions interface is requesting for the Lunch Train for Workspaces application to access a private conversation with the user of a client device 101A. In the embodiment of FIG. 5A, the "private conversation" refers to an virtual communications feed associated with an App DM object. Note, however, that the permission request message, 503, may include other permissions associated with the group-based communication scopes specified by group-based communication scope descriptor 313 or any additional permissions as described in the previous paragraph. Thus, the user of a client device 101A may accept the installation and permissions request via actuator button 502 or deny the request via actuator button 501. If the user clicks on actuator 502, the permissions granted to the Lunch Train for Workspaces application would include permissions to post messages to and read messages from the App DM object. Clicking on actuator 502 causes the client device 101A to transmit data to the group-based communication server 106 comprising an authorization grant.

At step 412, the group-based communication server 106 receives a signal comprising either an authorization or a denial of the request. In response to receiving a signal comprising an authorization, the group-based communication server 106, may execute optional step 414. At optional step 414, the group-based communication server 106 may transmit a signal to the client device 101A, which prompts the user to grant or deny additional permissions to the third party application. These additional requested permissions may correspond to additional permissions or group-based communication scopes as specified by group-based communication scope descriptor 313, additional permissions as specified by the descriptor of permissions to be requested on behalf of the third party application that was received at step 402, or any additional permissions. The prompt may be in the form of instructions from the group-based communication server that, when received by the client device, causes the client device to render a group-based communication object permissions interface.

Exemplary embodiments of such a group-based communication object permissions interface is shown in FIGS. 5B-C. With reference to FIG. 5B, permission requests messages, 506 and 507, indicate that the system is requesting permissions for the Lunch Train for Workspaces application to add slash commands and to post messages in all channels that it's a member of. This essentially is a request to grant or deny two group-based communication scopes. In other words, both group-based communication actions would be granted with regard to an object type (i.e. group-based communication channels) such that the third party application would be allowed to perform the group-based communication actions on any group-based communication channel that, in addition, is within the permitted group-based communication object set of the third party application. Actuator buttons 504 and 505 give the user of a client device 101A the option to either authorize or deny the request.

A variation of the embodiment of the group-based communication object permissions interface is shown in FIG. 5C. There, permission request message, 508, indicates that the system is requesting permissions for the Lunch Train for Workspaces to post messages and files. However, the embodiment in FIG. 5C is different from previous embodiments in that the user of a client device 101A may pick for which channels (i.e. the group-based communication objects) the user would like to grant the group-based communication actions. For example, if the user selects actuator 509 and then clicks on actuator button 514, then the permissions table 301 and the app tokens table 302 would be updated, as necessary, to include additional permissions for the Lunch Train for Workspaces application. The permissions table 301 would include all public channels within the permitted group-based communication object set for the Lunch Train for Workspaces application. Additionally, the app tokens table 302 would include, in the group-based communication scopes associated with the Lunch Train for Workspaces application, data specifying the ability to post messages and files to group-based communication channels. The consequence would be that the group-based communication actions of posting messages and files would then form part of the permitted group-based communication action set for the Lunch Train for Workspaces application.

The group-based communication system enables adding permissions "in bulk," such as when adding permissions to all public channels as discussed above in relation to FIG. 5C and actuator 509. To that end, the group-based communication server 106 may use the is_wildcard Boolean variable (see FIG. 3B) in the permissions table 301. To provide further context, when a user selects actuator 509 (see FIG. 5C) and then clicks on actuator button 514, then the group-based communication server 106 adds all public group-based communication channels (associated with the group in which the Lunch Train for Workspaces application is installed) to the permissions associated with the Lunch Train for Workspaces application. To do so, the group-based communication server 106 generates and stores a row in the permissions table that would include the is_wildcard variable set to "true." Further, for that row, the group-based communication server 106 would store, as group-based communication object type 307, data specifying that public group-based communication channels are to be associated with the is_wildcard variable. The row would thus store an indication that all such public group-based communication channels are part of the permitted group-based communication object set associated with the third party application specified by the app identifier 306 (i.e. Lunch Train for Workspaces in this instance).

In this embodiment, the group-based communication server 106 may further store the group-based communication object identifier 308 as a null value (or, in other embodiments, as zero) because there is no need to identify with particularity each of the public group-based communication channels; all of those channels are added "in bulk." Finally, the group-based communication server 106 sets the is_exclusion variable (see FIG. 3B) to "false," since the user has not excluded any public group-based communication channels from the permissions (see FIG. 5C). More details regarding the is_exclusion variable are provided below.

As an additional step to adding permissions "in bulk," if any pre-existing rows in the permissions table 301 associate the third party application with any one of the public group-based communication objects that were added via the is_wildcard variable, then the group-based communication server 106 would remove those pre-existing rows to avoid having redundant information in the permissions table 301. An ordinarily skilled artisan could envision an embodiment where the removal of redundant information would be performed as a first step, as a last step, or as any other step in the process of adding permissions "in bulk."

As this discussion already alluded to, setting the is_exclusion variable to "true" removes a specific public group-based communication channel that was added "in bulk" (i.e. via the is_wildcard variable) form the permitted group-based communication object set of a third party application. To do so, the group-based communication server 106 would generate a row for the individually excluded public group-based communication channel in the permissions table 301. The row would identify the excluded public group-based communication channel via group-based communication object identifier 308. The row would also indicate that the public group-based communication channel was added "in bulk," via the is_wildcard variable, which would be set as "true." Finally, the row would have to properly associate the excluded group-based communication channel with the permissions of the third party application via permission identifier 304 and app identifier 306. These series of steps, in essence exclude the specified public group-based communication channel from the permissions of a third party application.

Regarding another aspect of FIG. 5C, if a user selects actuator 510, then the user may specify with granularity which group-based communication channels, form the channels associated with the user identifier (i.e. the channels that the user is a member of), to include in the permitted group-based communication object set of the Lunch Train for Workspaces application. In some embodiments, activating actuator 510 may in turn invoke a further interface where a user may selectively choose among available channels.

The user may also select to not grant any additional permissions during the installation stage. The user may do this by selecting actuator 511 and then clicking on actuator button 514 to install the Lunch Train for Workspaces application without granting any additional permissions. However, note that as FIG. 5C illustrates, the user may update the permissions associated with the Lunch Train for Workspaces application at a later stage, i.e. after installation, via other methods. Thus, installing the application without granting any further permissions may still be beneficial to the user and other users belonging to the same group to which the Lunch Train for Workspaces application is to be installed.

At step 415, in response to receiving an authorization grant for the requested permissions, the group-based communication server 106 redirects the user of a client device to the redirect_URI received at step 408.

At step 417, the group-based communication server 106 transmits to the redirect_URI hosted by third party application provider a temporary code indicating that the user of a client device has provided an authorization grant for the requested permissions. The temporary code is valid only for a specified period of time to ensure the security of the authentication process.

At step 418, the group-based communication server 106 receives a signal comprising the temporary code, the third party application identifier, the third party application provide identifier, the cryptic string client_secret, and a redirect_URI.

At step 420, in response to determining that the signal received at step 420 comprises information that verifies the identity of the third party application provider, the group-based communication server 106 generates and transmits an app token to the third party application provider.

At step 422, the group-based communication server 106 generates an app user account corresponding to the third party application that was just installed. The group-based communication server 106 stores the data structure representing the app user account in the group-based communication repository 107. The app user account is at least associated with a group in the group-based communication system via a group identifier. Provided below is one possible embodiment of a data structure comprising an app user account.

```
{
  "data":
  [
    {
      "id": 6207803345,
      "username": "namely_bot1",
      "email": "appuser-T061GA5HN-A0645SA56@slack-bots.com",
      "team_id": 6050345600,
      "deleted": 1485397246,
      "created": 1458246382,
      "password": "",
      "conf code": secret_string_variable_num_1,
      "api_code": secret_string_variable_num_2,
      "confirmed": 0,
      "is_away": 0,
      "is_admin": 0,
      "is_owner": 0,
      "is_restricted": 0,
      "is_ultra_restricted": 0,
      "is_bot": 3,
      "profile":
"{\"bot_id\":\"B0662Q48G\",\"api_app_id\":\"A0645SA56\",\"first_name\":\
"Namely\",\"avatar_hash\":\"a74d2d92a5f9\",\"full_name\":\"Test
BotNew\",\"preferred_name\":\"test_bot2\",\"image_24\":\string_variable_holding_
URI_num_1,\"image_32\":\ string_variable_holding_URI_num_2,\"image_48\":\
string_variable_holding_URI_num_3,\"image_72\":\
string_variable_holding_URI_num_4,\"image_192\":\
string_variable_holding_URI_num_5,\"image_512\":\
string_variable_holding_URI_num_6,\"image_1024
string_variable_holding_URI_num_7,\"image_original\":\
string_variable_holding_URI_num_8,\"real_name:\"Test Bot
New\",\"real_name_normalized\":\"Test Bot New\",\"full_name_normalized\":\"Test Bot
New\",\"preferred_name_normalized\":\"test_bot-
x\",\"fields\":null,\"_unpacked\":true,\"always_active\":true}",
      "color": "BLOB",
      "has_push": 0,
      "push_dirty": 1,
      "push_count": 0,
      "has_email": 1,
      "email_dirty": 0,
      "has_summary": 0,
      "last_client_login": 1458581393,
      "is_inactive": 1,
      "date_model_update": 1508194156,
      "external_id": 0,
      "manual_away_ts": 0,
      "tz": "America/Los_Angeles",
      "is_pre_provisioned": 0
    }
  ]
}
```

At step 424, the group-based communication server 106 generates a record of the app token and stores it in the group-based communication repository 107. The app token is stored in the app tokens table 302 and it is associated with the app user account of the third party application via a third party application identifier. Further, the generated and stored app token reflects any group-based communication scopes associated with the permissions that the user may granted to the third party application during the installation process.

At step 426, the group-based communication server 106 generates the entries for the permissions table 301 that reflect the permissions granted to the third party application by the user of a client device 101A. The group-based communication server 106 stores those entries in the permissions table 301 in the group-based communication repository 107. The permissions table 301 is associated with the third party application via a third party application identifier and an app user account identifier. Note that the permissions table 301 holds data related to the permissions associated with an entire group.

Figure 4C:
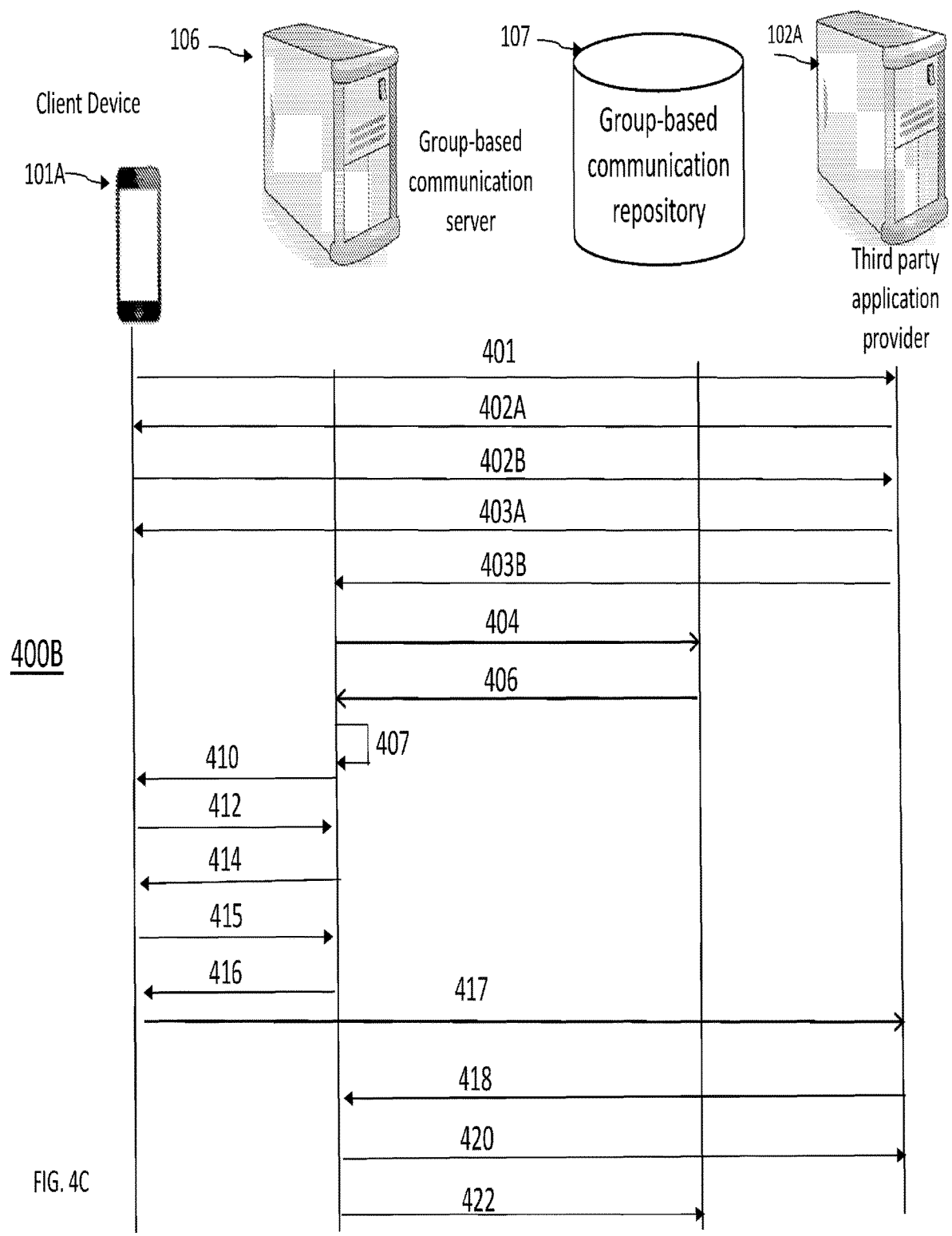
Figure 4D:
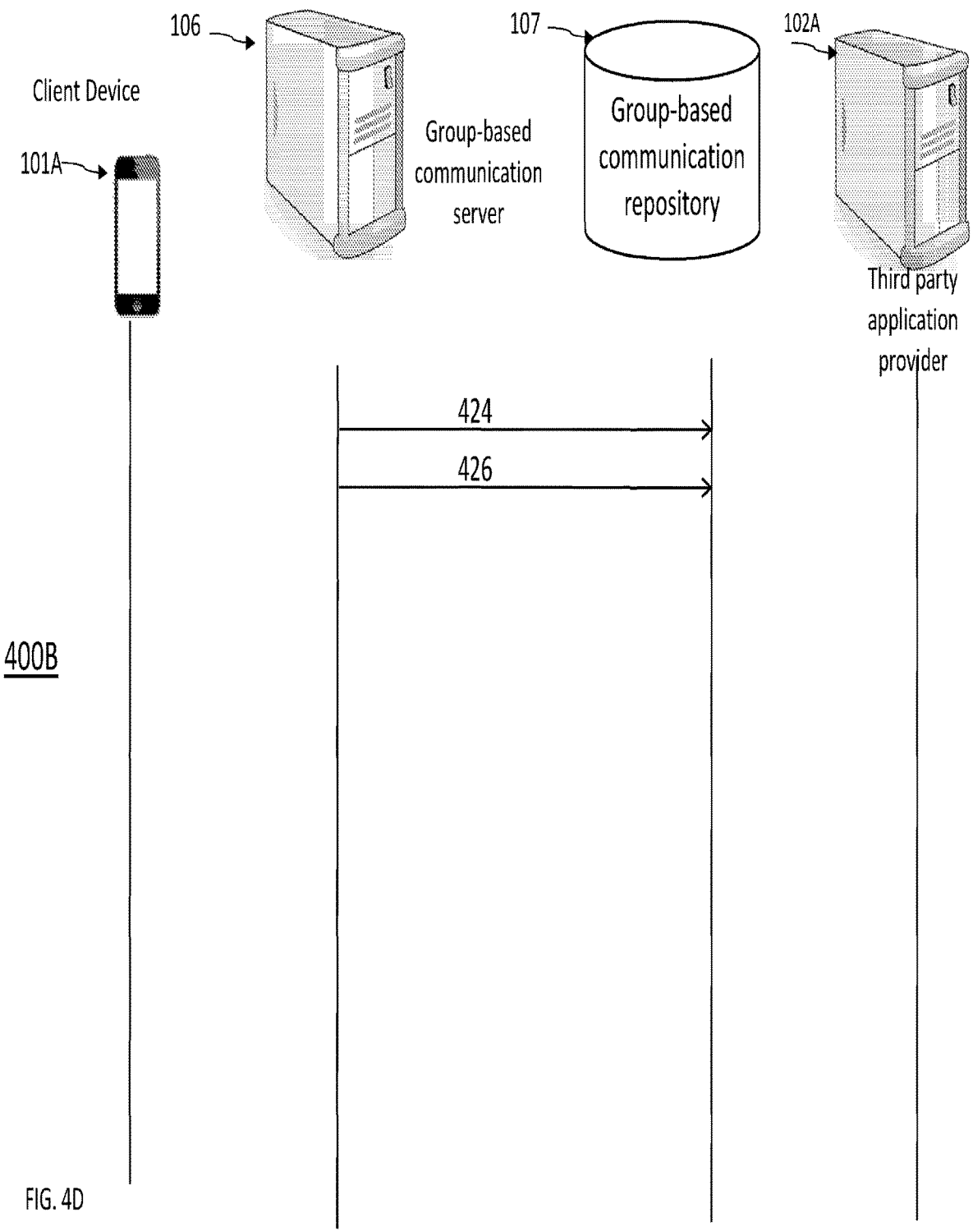

FIGS. 4C-D illustrate a signal diagram representing a second embodiment of an installation procedure 400B of a third party application in a group of the group-based communication system 105. FIG. 4D has many similarities with FIG. 4A, but it has some important distinctions. With reference to the embodiment of FIG. 4D, the interactive button described in relation to FIG. 4A, step 402, may instead be provided by a user interface associated with a third party application provider 102A. This interactive button element which forms part of the user interface may be displayed by the client device 101A. For example, the interactive button may be part of a website provided by the third party application provider 102A, which is accessible by a user of a client device 101A. In this manner, at step 401, the user of a client device 101A may provide inputs to the website provided by the third party application provider 102A, which may serve as a notification to the third party application provider 102A of a request to install a third party application in the group-based communication system 105.

At step 402A, in response to receiving an event signal indicating a click of an interactive button, the third party application provider 102A may prompt the user of a client device 101A to provide a user account and a group onto which they would like to install the third party application.

At step 402B, the third party application provider 102A receives the requested information from the client device 101A. At step 403A, in response to receiving such information from the user of a client device 101A, the third party application provider 102A redirects the user of a client device 102A to a URI, hosted by the group-based communication server 106, where the authorization and installation may begin. At step 403B, the group-based communication server 106, in addition to redirecting the user, transmits to the URI several parameters required for the authorization and installation processes. Such parameters may comprise, for example, a client identifier, a descriptor of the permissions to be requested on behalf of the third party application, an optional URI—redirect_URI—where the user of a client device should be redirected at the conclusion of the authorization and/or installation process, an optional unique state string to be transmitted upon completion of the authorization and/or installation process, and an optional group identifier associated with the group where the third party application is to be installed.

Subsequently, in response to receiving the parameters via the URI hosted by the group-based communication server 106, the group-based communication server 106 enters step 404, which is identical to step 404 described in relation to FIG. 4A above. Similarly, the system follows steps 406, 407, 410, 412, 414, 415, 416, 417, 418, 420, and 422, all of which are analogous and identical to the similarly numbered steps described with reference to FIG. 4A. Note, however, that the embodiment of FIG. 4D omits steps 408 and 409 since those steps are not necessary in the embodiment disclosed in FIG. 4D.

Adding an Application to Group-Based Communication Objects

The group-based communication system 105 is configured to allow users to add third party applications to additional group-based communication objects that form part of a candidate group-based communication object set. The group-based communication server 106 may provide users with different alternatives for adding third party applications to additional group-based communication objects. In some embodiments, during the installation process, and via the group-based communication object permissions interfaces, the group-based communication server 106 may give users the option to select and grant additional permissions for the third party application. These processes were already described in the discussion of FIGS. 4A-D and with reference FIGS. 5A-5C.

FIG. 6 is a signal diagram representing an embodiment of a process to add a third party application to a group-based communication object. At step 602, the group-based communication server 106 receives from a client device an input request indicating that a user is requesting to add a third party application to a group-based communication object.

At step 603, in response to receiving the signal comprising a request to upgrade the permissions of a third party application, the group-based communication server 106 prompts the user to grant or deny additional permissions to the third party application. The prompt may be in the form of instructions from the group-based communication server that, when received by the client device, causes the client device to render a group-based communication object permissions interface. An exemplary embodiment of such a group-based communication object permissions interface is shown in FIG. 7A. The function of actuator buttons 701 and 702 as well as permission request messages 703 and 704 is similar to the function of the actuators and messages disclosed with respect to FIG. 5B. In FIG. 7A, the group-based communication server 106 may prompt a user of a client device 101A to authorize the Lunch Train for Workspaces application the permissions to "Add slash commands" and "Post messages as the app" within the group-based communication channel, atlanta-united. A user of a client device may use actuator buttons 701 and 702 to grant or deny the permissions. Clicking on actuator button 702 issues an authorization grant for the requested permissions, which may be received by the group-based communication server 106.

Note that FIG. 7A is directed to an embodiment where the group-based communication server 106 prompts the user of a client device 101A for authorization to add a group-based communication object—atlanta-united—to a permitted group-based communication object set, with the intended result that the third party application—Lunch Train for Worskspaces—would then be authorized to apply its group-based communication scopes (as specified by its respective group-based communication scope descriptor 313) to atlanta-united. The end result is that, if the user of the client device 101A authorizes the request, then Lunch Train for Workspaces would acquire new permissions (i.e. a new set of pairings between group-based communication objects and group-based communication actions): (a) add slash commands in atlanta-united and (b) post messages as the app in atlanta-united. However, other variations of FIG. 7A are possible. For example, the group-based communication server 106 could instead prompt the user of a client device 101A for authorization to simultaneously add or select permissions comprising various group-based communication actions to be associated with the additional group-based communication object. FIG. 7B illustrates an exemplary embodiment of the interface that allows a user to select from among a plurality of requested group-based communication actions. In the embodiment depicted in FIG. 7B, the user of a client device 101A has selected to allow the Lunch Train for Workspaces application to read and write messages in atlanta-united (the additional group-based communication channel to which the third party application will be granted permissions upon authorization).

At step 605, in response to receiving from a user of a client device 101A a signal comprising an authorization grant, the group-based communication server 106 accesses the group-based communication repository 107 to modify the permissions associated with the app user associated with the app token received from the third party application provider. The group-based communication server 106 modifies the permissions table 301 such that the group-based communication object included in the permissions request is included in the permitted group-based communication object set of the third party application. Further the group-based communication server 106 modifies the app tokens table 302 such that the group-based communication actions included in the permission request are included in the permitted group-based communication action set of the third party application. In short, the group-based communication server 106 modifies the group-based communication repository 107 (i.e. tables 301 and 302) such that the group-based communication actions and group-based communication objects granted by the authorization grant become associated with the third party application.

As an exemplary embodiment, with reference to FIG. 7A, the group-based communication server 106 could receive an authorization grant from a user as a result of a user clicking on actuator button 702. In response, the group-based communication server 106 would thus modify the permissions table 301 associated with the Lunch Train for Workspaces so as to include the group-based communication channel "atlanta-united" within the permitted group-based communication object set. Because the group-based communication actions corresponding to "add slash commands" and "post messages as the app" would have already been included in the group-based communication scopes specified by the group-based communication scope descriptor 313, no further updating of the group-based communication repository 107 would be required to include those group-based communication actions within the permitted group-based communication action set of the Lunch Train for Workspaces application. In this manner, after all these steps, the permissions table 301 and app tokens table 302 associated with the Lunch Train for Workspaces application would be configured to map the permitted group-based communication object set with the permitted group-based communication action set.

In the different embodiment of FIG. 7B, the group-based communication system 105 follows a similar sequence of events when the user clicks on actuator button 750, but the sequence includes some significant differences that merit discussion. In response to receiving an authorization grant as a result of a user clicking on actuator button 750, the group-based communication server 106 would first modify the permissions table 301 associated with the Lunch Train for Workspaces application. There, the group-based communication server 106 would include the group-based communication channel, atlanta-united, within the permitted group-based communication object set.

After modifying permissions table 301, the group-based communication server 106 would then modify the group-based communication repository 107 to include, in the permitted group-based communication action set of the Lunch Train for Workspaces application, the group-based communication actions corresponding "read" and "write" in atlanta-united. In one embodiment, this step would consist of the group-based communication server 106 modifying the app tokens table 302 so as to include, in the permitted group-based communication actions of the Lunch Train for Workspaces application, the group-based communication actions corresponding to "read" and "write;" the app tokens table 302 would also have to associate those group-based communication actions to atlanta-united. In such an embodiment, the app tokens table 302 would have to be specially configured to support storing group-based communication actions for specific group-based communication objects (e.g. atlanta-united). An ordinarily skilled artisan would recognize that this embodiment would thus require a slight modification of the app tokens table disclosed in FIG. 3C.

However, in another embodiment related to FIG. 7B, which does not require a special modification of app tokens table 302 (see FIG. 3B), the step of adding the permitted group-based communication actions requires the utilization of an objects exceptions table 303 (see FIG. 3D). Because the prompt illustrated in FIG. 7B provides the permission options of reading, writing, and accessing history and files in atlanta-united, the group-based communication scope descriptor 313 (see FIG. 3C) for Lunch Train for Workspaces includes those respective group-based communication scopes (e.g. channel:read, channel:write, channel:history). This means that, but for the inclusion of an exception in the group-based communication repository 107, simply adding atlanta-united to the permitted group-based communication object set would confer onto the Lunch Train for Workspaces application the permissions to read, write, and access history and files in atlanta-united (its object type is group-based communication channel).

Thus, to continue with the discussion of FIG. 7B, in this embodiment, the group-based communication server 106 first receives the authorization grant from a user of a client device 101A (as already described above with regards to FIG. 7B), and then modifies the permissions table 301 to include atlanta-united within the permitted group-based communication object set (as already described above with regards to FIG. 7B). After these two preliminary steps, then the group-based communication server 106 also sets, in permissions table 301, the includes_object_exceptions Boolean 315 to "true." By setting the includes_object_exceptions Boolean 315 to "true," the group-based communication server 106 stores an indication that the permissions of the Lunch Train for Workspaces application with regards to atlanta-united include at least one exception. Thereafter, the group-based communication server 106 modifies object exceptions table 303 so as to include an entry associated with atlanta-united (via a group-based communication object identifier 326 that matches that of atlanta-united). There, the group-based communication server 106 would modify the excluded group-based communication scope 330 to include data specifying that "accessing history and files" (i.e. channel:history) is an excluded group-based communication scope with regards to group-based communication channel, atlanta-united. Further, object exceptions table 303 would associate the exception to the Lunch Train for Workspaces application via the app identifier 323 and, optionally, the permission identifier 321.

In this manner, the group-based communication repository 107 would be configured to include, in the permitted group-based communication actions of the Lunch Train for Workspaces application, the group-based communication actions of reading and writing in atlanta-united (since the respective group-based communication scopes are not excluded with regards to atlanta-united). An ordinarily skilled artisan would understand that the identifiers stored in each of the tables (301-303) would all have to match to make the correct associations between entries in the tables. For example, the app identifier 323 from object exceptions table 303 must be identical to the app identifier 306 in permissions table 301 in order to have an association between the entries of those two tables.

Regardless of the embodiment implemented with regards to FIG. 7B, as a result of the steps described above for the various embodiments, the group-based communication repository 107 would be configured to properly map the newly permitted group-based communication object set with the newly permitted group-based communication action set. This results from the implicit associations with the action changes due to the identifiers that populate tables 301, 302, and, optionally, 303.

At step 606, the group-based communication server 106 transmits a signal to the third party application provider to confirm the modification to the permissions associated with the third party application. In one particular embodiment of step 606, the signal, a action_granted signal, notifies the third party application provider that the new group-based communication action was granted may comprise following data:

```
{
    "token": "verification_token",
    "team_id": "T061EG9R6",
    "api_app_id": "A0BLA3EP2",
    "event": {
        "type": "permission_granted",
        "permissions": [
            "channel:write"
        ],
        "trigger_id": variable_holding_trigger_id
    },
    "type": "event_callback",
    "authed_teams": [],
    "event_id": "Ev0BQ5FTL0",
    "event_time": 1497911545
}
```

At step 607, the group-based communication server 106 receives from a third party application provider 102A a request for a descriptor of the modification to the permissions associated with the confirmation issued at 606. At step 608, in response, the group-based communication server 106 may transmit data to the third party application provider 102A comprising details regarding the group-based communication objects and actions involved with the new permissions. The third party application may then utilize the signal to execute actions, manipulate its own data, store a record of the new permissions for future reference, or the like. In a particular exemplary embodiment, the second transmitted signal may comprise the following exemplary data:

```
{
    "token": "verification_token",
    "team_id": "T061EG9R6",
    "api_app_id": "A0BLA3EP2",
    "event": {
        "type": "resources_added",
        "resources": [
            {
                "resource": {
                    "type": "im",
                    "grant": {
                        "type": "specific",
                        "resource_id": "D0BH95DLH"
                    }
                },
                "permissions": [
                    "chat:write",
                    "im:read",
                    "im:history",
                    "commands"
                ]
            }
        ]
    },
    "type": "event_callback",
    "authed_teams": [],
    "event_id": "Ev0BLTJ7JM",
    "event_time": 1497911545
}
```

On the other hand, if at step 604, the group-based communication server 106 receives a denial message from the client device 101A, then the group-based communication server 106 aborts the procedure so that none of steps 605-608 take place.

The group-based communication server 106 may allow users to add permissions via an App DM associated with the third party application. For example, the group-based communication server 106 may send data to the client device 101A that causes the client device 101A to render a graphical user interface, i.e. the App DM, that allows a user to configure the permissions of the third party application. This rendering would happen before step 602 from process 600.

Figure 9A:
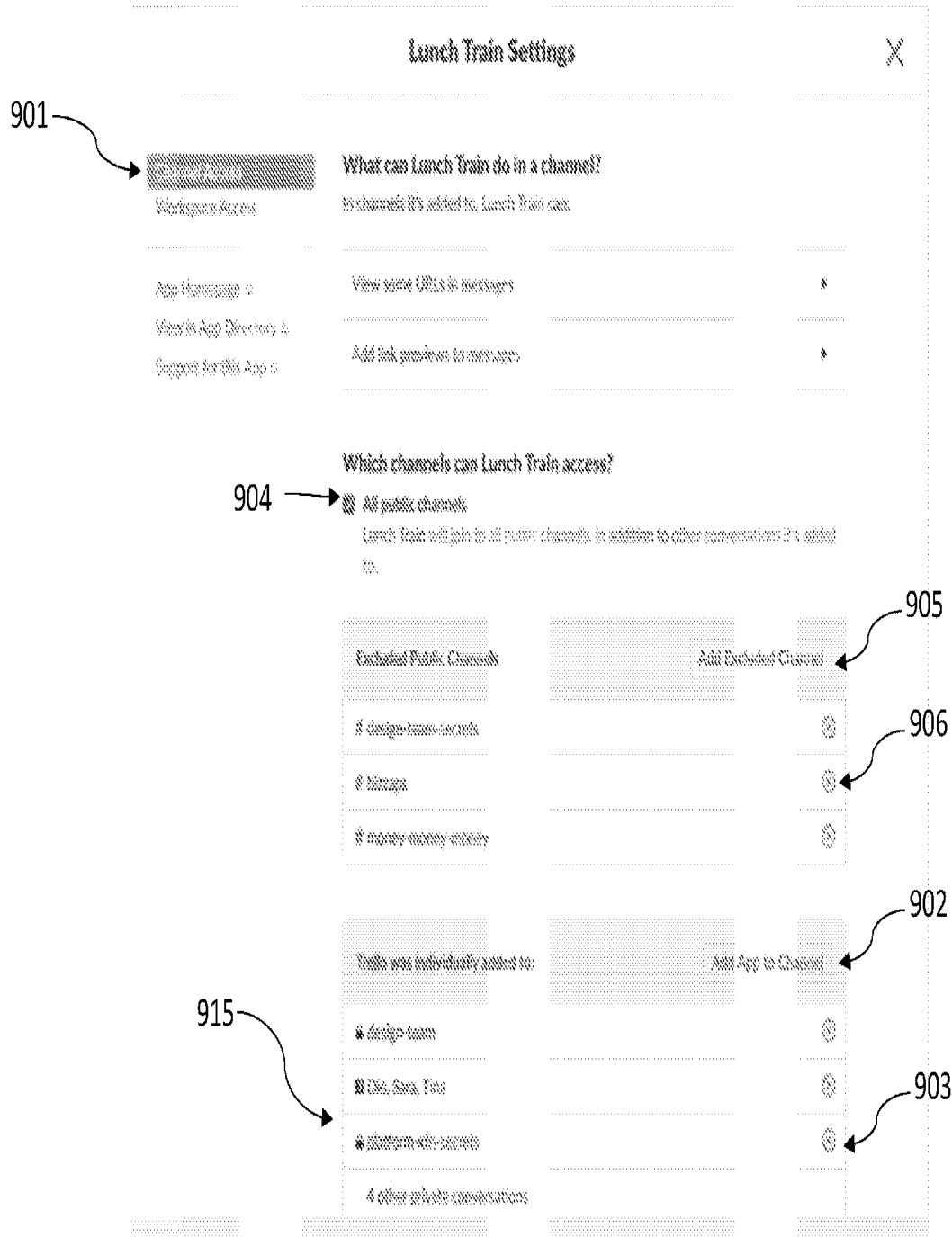

FIGS. 9A-I provide illustrations of some embodiments of an App DM. FIG. 9A shows the configuration tab for one App DM associated with a third party application—Lunch Train for Workspaces—and provides the user with the ability to view different menus to view the permissions of the Lunch Train for Workspaces application. In this particular embodiment of FIG. 9A, the configuration tab is named "Channel Access" as shown by the tab indicator 901. In addition, for example, via at least the actuator button (labeled "Add App to Channel"), 902, the group-based communication server 106 may allow the user to modify the permitted group-based communication objects for the Lunch Train for Workspaces application. In this particular embodiment, because the user would be requesting to add group-based communication channels to the permitted group-based communication object set of the third party application, the candidate group-based communication set would consist of group-based communication channels associated with both, the group to which the user of a client device 101A belongs and the user account of the user of a client device 101A. In this manner, the candidate group-based communication object set is generated based on the group identifier (associated with the group where the third party application is installed) and the user identifier (associated with the user account of the user who is in the process of configuration permissions for the third party application).

Note that in the embodiment described with regards to FIG. 9A above, a user of a client device 101A may not add the third party application to a group-based communication channel to which the user itself does not have access to. In other words, if a user of a client device 101A requests to add a third party application to a group-based communication channel, the user of a client device 101A must be a member of a private group-based communication channel or must have access to a public group-based communication channel. If the user of a client device 101A does not have access to a group-based communication channel, then that user may not grant to a third party application permissions with regards to the group-based communication channel. This is an important distinction regarding group-based communication channels and other group-based communication objects within a group. The distinction is important because, in some embodiments, users belonging to a group may be members of different subsets of group-based communication channels within the group.

The group-based communication server 106 also enables users to remove permissions from a third party application's permissions table 301. With reference to FIG. 9A, the user may click on actuator buttons (labeled with a cross "x"), 903, next to each of the permitted group-based communication channel names. In this manner, the group-based communication server 106, in response to receiving a signal indicating such an input from the user of a client device 101A, may modify the permissions table 301 so as to remove the mapping between the third party application and the group-based communication channel associated with the user input. In some embodiments, the group-based communication server 106 additionally sends a signal to the third party application, wherein the signal may comprise a notification that a group-based communication object was removed from the permissions associated with the third party application.

Figure 9B:

FIG. 9B illustrates yet another tab of the App DM; here, the tab provides a summary of the permissions of the Lunch Train for Workspaces application within a particular group ("My Test Company"). The permissions conferred to the embodiment illustrated in FIG. 9B include only one permitted group-based communication object: the App DM with one particular user, through which the Lunch Train for Workspaces application may communicate (i.e. read messages, write messages, and access the conversation history within the App DM). To render such a tab, the App DM must necessarily obtain the permissions associated with the third party application (via its app user account and app identifier) by accessing and cross-referencing both, the permissions table and the app tokens table associated with the third party application.

Figure 9C:
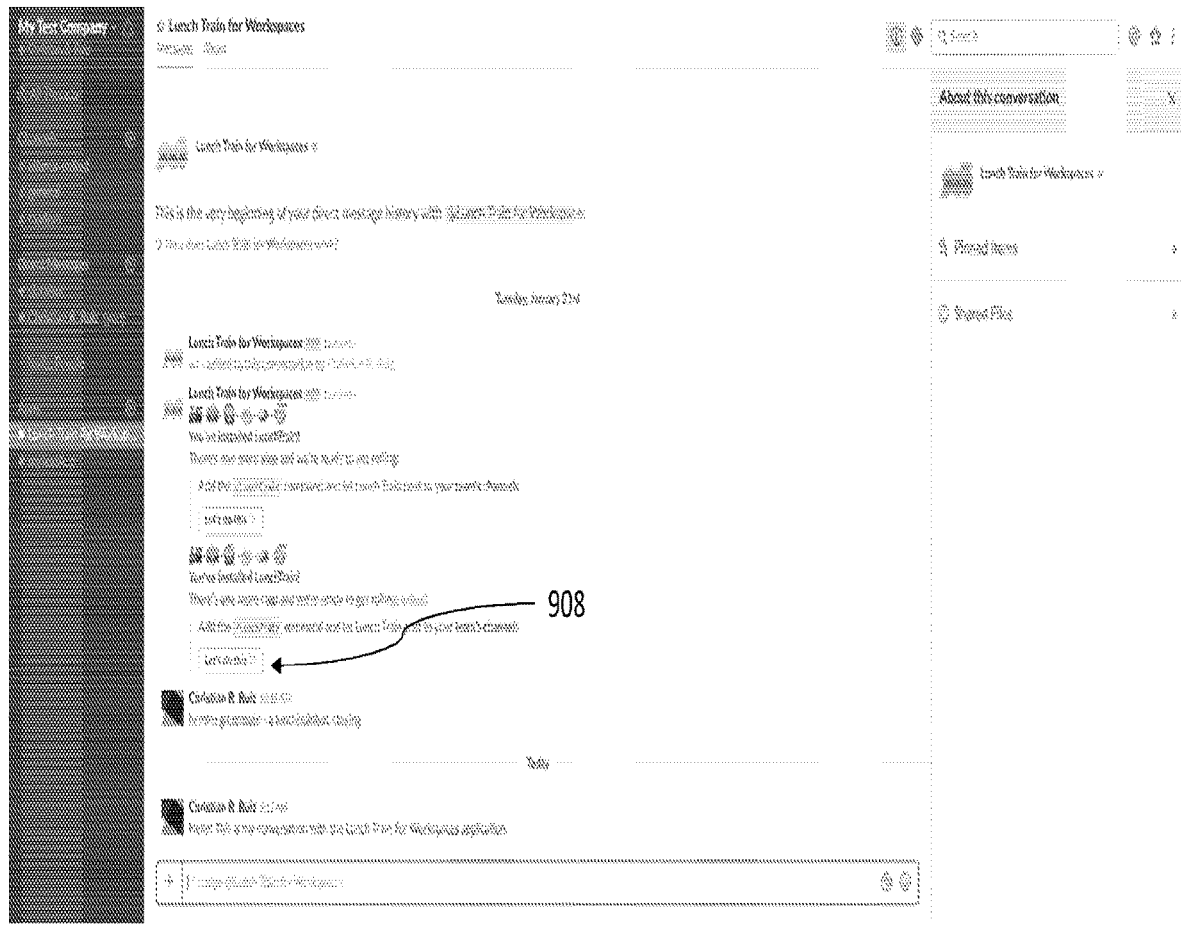

FIG. 9C illustrates one more tab of the App DM; here, the tab provides a history of the conversation between the user with permission to access the App DM tab and the Lunch Train for Workspaces application. The tab illustrated in FIG. 9C may be referred to as a "conversation tab." Further, the tab illustrated in FIG. 9C enables a user to post messages that are accessible by the third party application. In general, the tab illustrated in FIG. 9C also allows the user to interact with the third party application. For example, FIG. 9C shows an interactive button, 908, displaying "Let's do this." In other embodiments, the interactive button, 908, may be substituted by any one of a plurality of possible display screen interactive elements. The user, upon clicking on that button may send input signals to the third party application and may trigger event signals in the group-based communication system which may also be transmitted to the third party application. The third party application may use these signals to execute appropriate functions. In general, the tab illustrated in FIG. 9C may function similarly to a group-based communication channel.

Figure 9D:
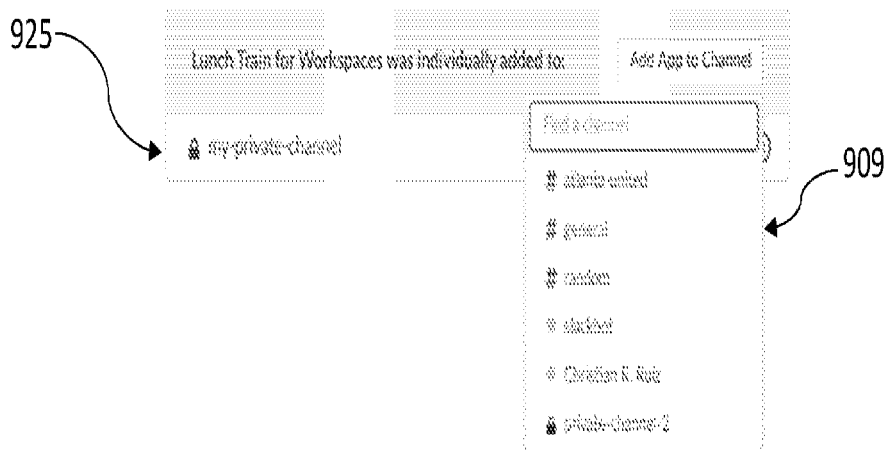

FIG. 9D illustrates the candidate group-based communication channels set where a user has selected to add an app to a channel, via actuator button 902. Menu 909 displays for the user the candidate group-based communication channels, which in this particular embodiment consist of the group-based communication channels atlanta-united, general, random, and private-channel-2. In this manner, the user of a client device 102A can select, via menu 909, any one of those group-based communication channels. The group-based communication server 106, in turn, may grant to the third party application (associated with the App DM) permission to access the group-based communication channels that the user selected. In this embodiment, the user of a client device 102A must have access to a group-based communication channel before the group-based communication server 106 lists the group-based communication channel as an option in menu 909.

In a variation of the previous embodiment, after the user selects one of the candidate group-based communication channels listed in menu 909 (see FIG. 9D), or one of the permitted group-based communication channels listed in any of menus 915 (see FIG. 9A), 925 (see FIG. 9D), or 935 (see FIG. 9F) the group-based communications server 106A may prompt the user to select one or more of the channel object sets to include in the permissions of the third party application. In this embodiment, the group-based communication server 106 transmits to a client device 101A an interface to enable the user of the client device 101A to selectively choose from a menu the group-based communication objects that form part of the channel object set of each of the selected group-based communication channels.

Figure 9E:
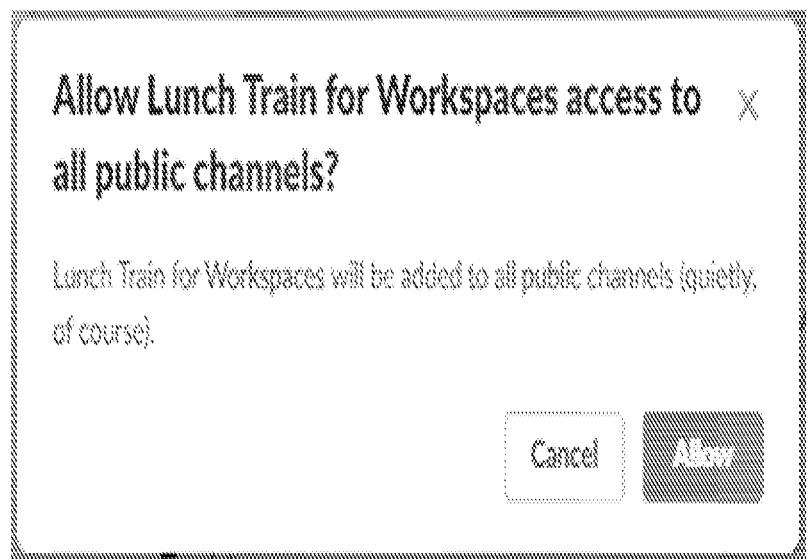
Figure 9F:
Figure 9G:

An exemplary embodiment of such an interface is shown in FIG. 9G. FIG. 9G illustrates an interface rendered via a client device 101A after a user selects group-based communication channel "atlanta-united" from a menu such as menu 909 (see FIG. 9D). A similar interface could be rendered via a client device 101A after a user selects one of the permitted group-based communication channels listed in any of menus 915 (see FIG. 9A), 925 (see FIG. 9D), or 935 (see FIG. 9F). The user of a client device 101A may interact with the interface to selectively choose the group-based communication objects that the third party application would gain access to. FIG. 9G gives the user the option to add permissions with regards to all objects in the group-based communication channel (i.e. the full channel object set), to selectively choose the group-based communication objects in the group-based communication channel, or to provide no access to any of the group-based communication objects in the channel object set. Subsequently, after the group-based communication server 106 receives an authorization grant from client device 101A, such as would occur after the user makes a selection and clicks button actuator 950, the group-based communication server 106 modifies the permissions associated with the third party application to reflect the new permissions selected and granted by the user.

The modification of the permissions may be as described in other sections of this disclosure such as the relevant discussion under the section labeled "Group-Based Communication Repository" of this disclosure. Further, this functionality of selectively choosing group-based communication objects in a channel object set is enabled via object exceptions table 303. Object exceptions table 303 keeps track of the selected group-based communication objects in a channel object set via at least the excluded object identifier 328 and excluded object type 327. The use of object exceptions table 303 was illustrated in the previous discussion regarding FIG. 7B, and that discussion applies to this embodiment with the slight modification that, instead of utilizing the object exceptions table 303 to keep track of excluded group-based communication scopes, the table is here utilized to keep track of the group-based communication objects that have been excluded from the permissions related to the channel object set. The consequence is that the group-based communication system 105 may thus determine, by utilizing the object exceptions table 303, the group-based communication objects in the channel object set that are accessible to a third party application.

In another variation of the previous embodiments, after the user selects one of the candidate group-based communication channels listed in menu 909 (see FIG. 9D) or one of the permitted group-based communication channels listed in any of menus 915 (see FIG. 9A), 925 (see FIG. 9D), or 935 (see FIG. 9F), the group-based communications server 106A may prompt the user to select one or more group-based communication actions to include in the permissions of the third party application. In this embodiment, the group-based communication server 106 transmits to a client device 101A an interface to enable the user of the client device 101A to selectively choose from a menu the group-based communication actions.

Figure 9H:
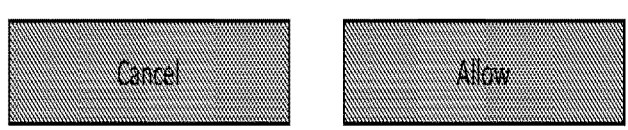

An exemplary embodiment of such an interface is shown in FIG. 9H. FIG. 9H illustrates an interface rendered via a client device 101A after a user selects group-based communication channel "atlanta-united" from a menu such as menu 909 (see FIG. 9D). A similar interface could be rendered via client device 101A after a user selects one of the permitted group-based communication channels listed in any of menus 915 (see FIG. 9A), 925 (see FIG. 9D), or 935 (see FIG. 9F). The user of a client device 101A may interact with the interface to selectively choose the group-based communication actions that the third party application would be able to take with respect to group-based communication channel "atlanta-united." FIG. 9H gives the user the option to (A) add all group-based communication actions that the Lunch Train for Workspaces application usually obtains with regards to the same object type (i.e. those group-based communication actions specified in the pairings of (a) an object type—in this instance, group-based communication channel—and (b) a group-based communication action; these pairings are specified in the group-based communication scope descriptor 313 of the app tokens table 302 associated with Lunch Train for Workspaces), (B) selectively choose the group-based communication actions that Lunch Train for Workspaces may take in "atlanta-united," or (C) authorize no group-based communication actions with regards to "atlanta-united."

Subsequently, after the group-based communication server 106 receives an authorization grant from client device 101A, such as would occur after the user makes a selection and clicks button actuator 970, the group-based communication server 106 modifies the permissions associated with the third party application to reflect the new permissions selected and granted by the user. The modification of the permissions may be as described in other sections of this disclosure such as the relevant discussion under the section labeled "Group-Based Communication Repository" of this disclosure. Further, this functionality of selectively choosing group-based communication actions regarding a group-based communication object is enabled via object exceptions table 303. Object exceptions table 303 keeps track of the selected group-based communication actions afforded to the Lunch Train for Workspaces application for all group-based communication channels via at least the excluded group-based communication scope 330.

In yet another variation of the previous embodiments, after the user selects one of the candidate group-based communication channels listed in menu 909 (see FIG. 9D), or one of the permitted group-based communication channels listed in any of menus 915 (see FIG. 9A), 925 (see FIG. 9D), or 935 (see FIG. 9F) the group-based communications server 106A may prompt the user to select one or more group-based communication objects and group-based communication actions related to the one or more group-based communication objects. In this embodiment, the group-based communication server 106 transmits to a client device 101A an interface to enable the user of the client device 101A to selectively choose from a menu the group-based communication objects and the group-based communication actions.

An exemplary embodiment of such an interface is shown in FIG. 9I. FIG. 9I illustrates an interface rendered via a client device 101A after a user selects group-based communication channel "atlanta-united" from a menu such as menu 909 (see FIG. 9D). A similar interface could be rendered via client device 101A after a user selects one of the permitted group-based communication channels listed in any of menus 915 (see FIG. 9A), 925 (see FIG. 9D), or 935 (see FIG. 9F). The user of a client device 101A may interact with the interface to selectively choose group-based communication objects that comprise a channel object set. Additionally, the user of a client device 101A may interact with the interface to selectively choose the group-based communication actions that the third party application can take with regards to the selected group-based communication objects that comprise a channel object set. In this sense, FIG. 9I gives the user the option to add permissions with regards to all objects in the group-based communication channel (i.e. the full channel object set), to selectively choose the group-based communication objects in the group-based communication channel and the associated group-based communication actions, or to provide no access to any of the group-based communication objects in the channel object set.

Subsequently, after the group-based communication server 106 receives an authorization grant from client device 101A, such as would occur after the user makes a selection and clicks button actuator 990, the group-based communication server 106 modifies the permissions associated with the third party application to reflect the new permissions selected and granted by the user. The modification of the permissions may be as described in other sections of this disclosure such as the relevant discussion under the section labeled "Group-Based Communication Repository" of this disclosure.

FIG. 9E illustrates a permissions interface rendered after a user of a client device clicks or activates actuator button 904 as shown in FIG. 9A. As depicted in the descriptor accompanying actuator button 904, the user of a client device 102A may add the third party application "in bulk" to all the public channels available within the group where the third party application is installed. Thus, with regards to FIG. 9E, if the user allows the permission request, then group-based communication server 106 would modify the permissions table 301 associated with the third party application in question so as to include all public channels associated with the group identifier (the same group identifier shared by the app user account and the user account of the requesting user) in the permitted group-based communication object set. Adding permissions "in bulk" in this embodiment is similar to the discussion already set forth with regards to FIG. 5C, actuator 509, and the addition of permissions "in bulk" therein.

FIG. 9F illustrates a permissions interface rendered after a user of a client device clicks or activates actuator button 905 as shown in FIG. 9A. Note that actuator button 905 becomes available only if the third party application has been granted permission to access all public channels associated with a group identifier. As depicted in the descriptor accompanying actuator button 905, the user of a client device 102A may exclude specific group-based communication channels from the permitted group-based communication object set. In some embodiments, the menu 906 illustrated in FIG. 9G consists of only those public group-based communication channels within the permitted group-based communication object set. When a user clicks on any one group-based communication channel provided in menu 906, the user essentially requests that the selected group-based communication channel be removed from the permitted group-based communication object set associated with the third party application. The group-based communication system 105 enables this functionality via the is_exclusion Boolean variable in the permissions table 301 as depicted in FIG. 3B. The is_exclusion Boolean variable associated with a particular group-based communication object would be set as "true" to indicate that the group-based communication object should be excluded from the permissions associated with the third party application (i.e. the third party application associated with the group-based communication object via an app identifier).

Any group-based communication channel included in the list of excluded public channels may be removed from such a list via a similar method as described with respect to actuator buttons 903 above. The same type of actuators may be included in the menu listing the excluded public channels in FIG. 9G once any group-based communication channels are added to this list by the user. The actuator buttons would appear next to the entry indicating that a group-based communication channel is excluded, as would be indicated if the group-based communication channel were listed under the "Excluded Public Channels" menu in FIG. 9F.

In general, with regards FIGS. 9A-I, the group-based communication server 106 receives a series of inputs from a client device 101A indicating the addition of (a) one or more group-based communication objects that form part of a channel object set of a group-based communication channel and/or (b) one or more group-based communication channels to the permitted group-based communication object set. In response, the group-based communication server 106 generates the data structures corresponding to the permissions associated with the user selections and inputs. Further, the group-based communication server 106 modifies the permissions table 301 and app tokens table 302 so as to include a mapping of the additional permissions, i.e. the additional permitted group-based communication objects and the permitted group based communication actions, according to the user inputs via the App DM. In some embodiments, the group-based communication server 106 additionally sends a signal to the third party application, wherein the signal may comprise a notification that a new group-based communication object was added to the permissions associated with the third party application. These processes are similar to the steps discussed with regards to FIG. 6.

The group-based communication server 106 may provide other methods for adding or removing permissions associated with a third party application. For example, a user may post a command onto a group-based communication channel. In one embodiment, the command may take the form of a slash command-a string formatted to include a slash at the beginning, which invokes a command within the group-based communication system-such as "/invite" or "/kick." The group-based communication server 106, may, in response to receiving such a command, generate and transmit a signal to the client device 101A. As described above with relation to FIG. 6, the signal may prompt the user to grant or deny additional permissions to the third party application (e.g. for the "/invite" command) or grant or deny the removal of permissions from the third party application (e.g. for the "/kick" command).

As also described in relation to FIG. 6, the signals discussed in this embodiment may cause the client device 101A to render a group-based communication object permissions interface through which a user may authorize or deny requested additional permissions or removals of permissions for a third party application. In this sense, all the teachings provided above, with relation to FIG. 6 and regarding the granting and denial of permissions are relevant to the embodiments described herein. Thus, the group-based communication server 106, in response to receiving a signal indicating that a user granted additional permissions to a third party application may modify the permissions table 301 and app tokens table 302, as necessary, so as to include the additional mapping association between the third party application and the added permissions.

In some embodiments, after modifying tables 301 and 302 as necessary, the group-based communication server 106 additionally sends a notification signal to the third party application provider 102A to inform the recipient that a permission was added to the third party application. Similarly, the group-based communication server 106, in response to receiving a signal indicating that a user approved the removal of permissions from a third party application, may modify the permissions table 301 and app tokens table 302, as necessary, so as to remove the mapping association between the third party application and the permissions in question. Afterwards, the group-based communication server 106 sends a notification signal to the third party application provider to notify the recipient that a permission was removed from the third party application.

The methods that a group-based communication server 106 provides to add or remove permissions from a third party application are not limited to those methods described above. For example, the group-based communication server 106 may provide an interactive link on a group-based communication channel or in the profile associated with a group-based communication channel. The group-based communication server 106 may thus allow users to add or remove permissions for a third party application with regards to the group-based communication channel associated with the interactive link. In such embodiments, the discussions already provided for requesting additional permissions and removing permissions could be implemented so as to allow a user to add or remove permissions from a third party application.

Progressive Permissions

The group-based communication server 106 also enables a third party application to request additional permissions. Expanding permissions in this manner is referred to as progressive permissions because a third party application may progressively request and add permissions to the permissions table 301 and app tokens table 302 associated group in which it is installed. In this manner, the third party application may take actions with respect to group-based communication objects that were previously unavailable to the third party application. Alternatively, the third party application may take additional actions with regards to previously permitted group-based communication objects.

FIG. 8A illustrates an embodiment of a procedure in which a third party application requests additional permissions in a progressive manner. At step 801, the group-based communication server 106 receives from a client device a signal indicating that a user interaction with a third party application has occurred. In some embodiments, the interaction that generates the signal may comprise an input provided by a user of a client device 101A directed to an interactive button associated with the third party application—for example, a click on the interactive button. The third party application may, for example, post such an interactive button in an App DM group-based communication channel. In other embodiments, the interactive button may be substituted by any one of a plurality of possible display screen interactive elements. Further, in other embodiments, the interaction that generates the signal may comprise the invocation of a slash command associated with a third party application. The invocation of a slash command may be caused, for example, by a user of a client device 101A typing a command onto an App DM group-based communication channel.

In response, at step 802, the group-based communication server 106 transmits to a URI associated with a third party application provider a signal comprising a trigger identifier which is associated with the event associated with the interaction at step 801.

At step 803, the group-based communication server 106 receives from the third party application provider 102A a signal comprising a request to upgrade the permissions for the third party application associated with the third party application provider. In some embodiments, the signal comprising a request to upgrade the permissions includes information related to an app token, a list of requested additional group-based communication objects and actions, and the trigger identifier previously generated and transmitted to the third party application provider.

At step 804, in response to receiving the signal comprising a request to upgrade the permissions of a third party application, the group-based communication server 106 prompts the user to grant or deny additional permissions to the third party application. The prompt may be in the form of instructions from the group-based communication server that, when received by the client device, causes the client device to render a group-based communication object permissions interface. An exemplary embodiment of such a group-based communication object permissions interface may be as in FIGS. 7A and 7B. However, in other embodiments, the group-based communication object permissions interface may be one as in FIG. 5B. The previous discussions with regards to FIGS. 5B, 7A, and 7B apply equally to process 800. With reference to FIG. 5B, the group-based communication server 106 may prompt a user of a client device 101A for an authorization granting to the third party application, "Lunch Train for Workspaces," permission to "Add slash commands" and "Post messages as the app" within all channels it is a member of.

In an additional variation of the embodiment, the group-based communication server 106 prompts the user of a client device 101A for authorization to simultaneously add permissions comprising various group-based communication actions and group-based communication objects. FIG. 8B illustrates an exemplary embodiment of the interface that allows a user to select from among a plurality of requested group-based communication objects and group-based communication actions. In the embodiment depicted in FIG. 8B, the user of a client device 101A has selected to grant to the Lunch Train for Workspaces application permissions to access atlanta-united (a group-based communication channel), and the user has selected to allow the Lunch Train for Workspaces application to read and write messages in atlanta-united.

At step 805, the group-based communication server 106 receives from the client device 101A data indicating whether a user granted the request for additional permissions or denied such a request. If the user granted the request, then group-based communication server 106 receives an authorization grant, which causes it to enter step 806.

At step 806, in response to receiving from a user of a client device 101A a signal comprising an authorization grant, the group-based communication server 106 accesses the group-based communication repository 107 to modify, as necessary, the permissions table 301 and app tokens table 302 associated with the app user account that is associated with the app token received from the third party application provider. The group-based communication server 106 modifies, as necessary, the permissions table 301 and app tokens table 302 (and in some embodiments, object exceptions table 303) such that the group-based communication actions included in the permissions request are included in the permitted set of group-based communication actions of the third party application.

As an exemplary embodiment, with reference to FIG. 5B, the group-based communication server 106 could receive a grant confirmation message from a user as a result of a user selecting the "Authorize" button actuator, 505. In response, the group-based communication server 106 would thus modify the app tokens table 302 associated with the Lunch Train for Workspaces application so as to include "add slash commands" and "post messages as the app" within the permitted group-based communication scopes specified by the group-based communication scope descriptor 313.

At step 807, the group-based communication server 106 transmits a signal to the third party application provider to confirm the modification to the permissions associated with the third party application. In one particular embodiment of step 807, the signal, action_granted, notifies the third party application provider that the new group-based communication action was granted may comprise following data:

```
{
    "token": "verification_token",
    "team_id": "T061EG9R6",
    "api_app_id": "A0BLA3EP2",
    "event": {
        "type": "permission_granted",
        "permissions": [
            "channel:write"
        ],
        "trigger_id": variable_holding_trigger_id
    },
    "type": "event_callback",
    "authed_teams": [],
    "event_id": "Ev0BQ5FTL0",
    "event_time": 1497911545
}
```

At step 808, the group-based communication server 106 receives from a third party application provider 102A a request for a descriptor of the modification to the permissions associated with the confirmation issued at 807. At step 809, in response, the group-based communication server 106 may transmit data to the third party application provider 102A comprising details regarding the group-based communication objects and actions involved with the new permissions. The third party application may then utilize the signal to execute actions, manipulate its own data, store a record of the new permissions for future reference, or the like. In a particular exemplary embodiment, the second transmitted signal may comprise the following exemplary data:

```
{
    "token": "verification_token",
    "team_id": "T061EG9R6",
    "api_app_id": "A0BLA3EP2",
    "event": {
        "type": "resources_added",
        "resources": [
            {
                "resource": {
                    "type": "im",
                    "grant": {
                        "type": "specific",
                        "resource_id": "D0BH95DLH"
                    }
                },
                "permissions": [
                    "chat:write",
                    "im:read",
                    "im:history",
                    "commands"
                ]
            }
        ]
    },
    "type": "event_callback",
    "authed_teams": [],
    "event_id": "Ev0BLTJ7JM",
    "event_time": 1497911545
}
```

On the other hand, if at step 805, the group-based communication server 106 receives a denial message indicating that the user of a client device 101A did not grant the request for additional permissions, then, the group-based communication server 106 aborts the procedure and transmits to the third party application provider a signal comprising a notification of the denial.

The group-based communication system 105 makes such progressive permissions possible via a permissions API. The permissions API is a collection of methods and event types that inform an app user account, and therefore the third party application associated with it, about permission changes over time while also providing to the app user account with the ability to issue API calls to request for additional permissions. For example, the steps described in 803 above with regards to the signal comprising a request to upgrade the permissions, wherein the signal may comprise different parameters (the information regarding an app token, the list of additional group-based communication objects and actions, and the trigger identifier) may be embodied via an API call that is sent to the group-based communication server 106.

The progressive permissions described in this section, which are requested by the third party application via the API calls, are similar to the methods of adding permissions that were described in the previous section. However, the two features are fundamentally different. For example, adding a group-based communication channel to the permissions associated with a third party application may be done via the App DM, and corresponding App DM object, associated with the third party application. In that instance, no API call is necessary from the third party application to the group-based communication server 106. Instead, the group-based communication server 106 generates the prompts and the signals necessary to render the group-based communication object permissions interface in response to receiving certain inputs directly from the user. On the other hand, the permissions API allows third party applications to request additional permissions by sending signals to the group-based communication server 106. In some embodiments, the third party application may request these progressive permissions only in response to a user interaction with the third party application.

Figure 10:
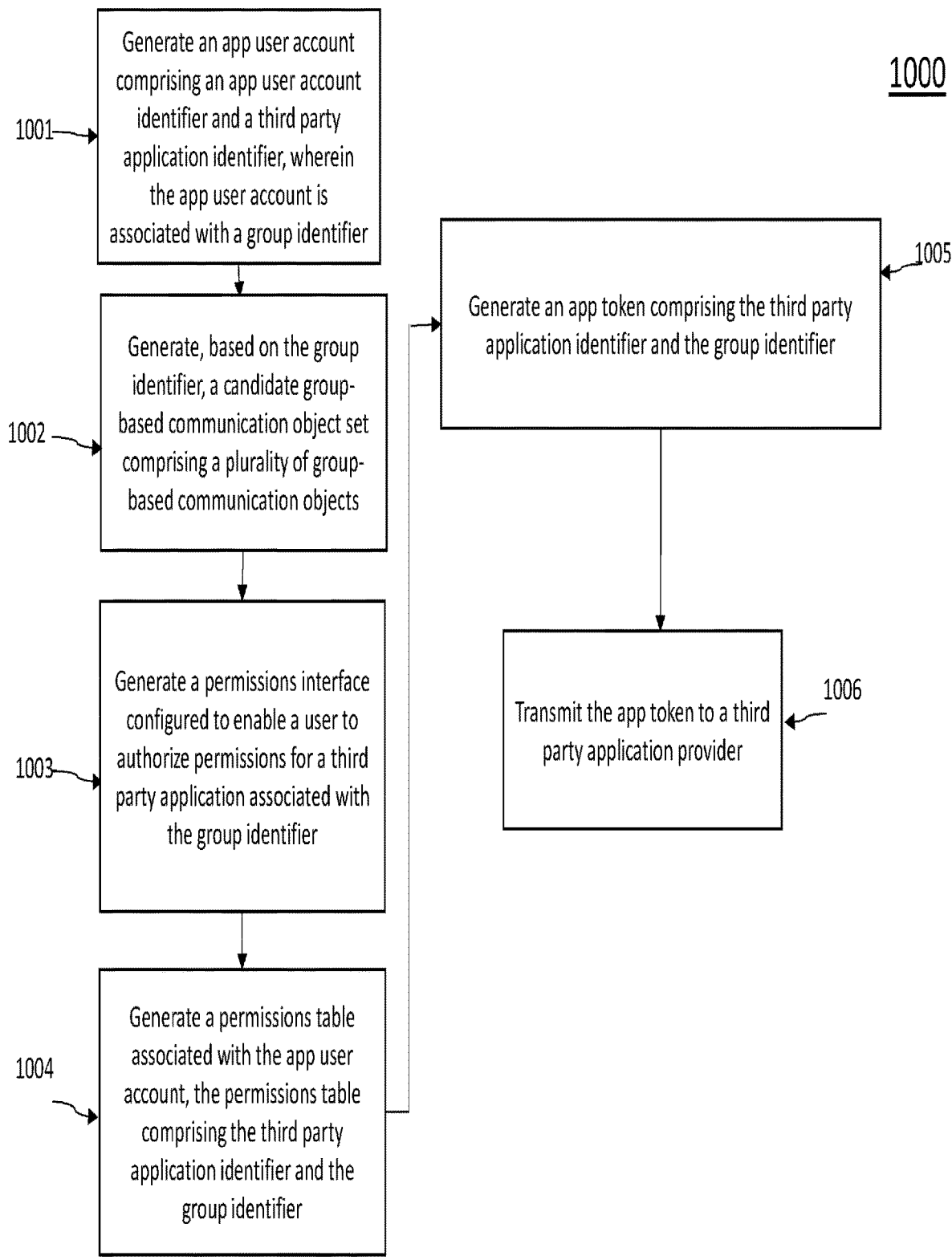

Various implementations of the group-based communication system 105 are disclosed in FIGS. 10-17. FIG. 10 illustrates an exemplary process, 1000, for selectively granting permissions to group-based communication objects in a group-based communication system 105. The method begins with generating an app user account comprising an app user account identifier and a third party application identifier, wherein the app user account is associated with a group identifier 1001. The method continues with generating, based on the group identifier, a candidate group-based communication object set comprising a plurality of group-based communication objects 1002. The method continues with generating a permissions interface configured to enable a user to authorize permissions for a third party application associated with the group identifier in order to generate a permitted group-based communication object set 1003. The method then continues with generating a permissions table associated with the app user account, the permissions table comprising the third party application identifier and the group identifier 1004. The method then continues with generating an app token comprising the third party application identifier and the group identifier 1005. Finally, the method ends with transmitting the app token to a third party application provider 1006.

In another embodiment of process 1000, in addition to process steps 1001-1006, the candidate group-based communication object set comprises group-based communication channels, private multi-party direct messages, public group-based communication channels, private direct messages, files, and user accounts. In a further variation of this particular embodiment, the permissions interface is configured to enable user selection of one or more group-based communication objects of the candidate group-based communication object set to generate a permitted group-based communication object set, and the permitted group-based communication object set comprises a subset of the candidate group-based communication object set.

In another embodiment of process 1000, in addition to process steps 1001-1006, the app user account is further associated with a user identifier, and the candidate group-based communication object set is generated based on the group identifier and the user identifier.

In another variation of process 1000, the permissions interface is a group-based communication object permissions interface configured to enable a user selection of one or more group-based communication objects of the candidate group-based communication object set to generate a permitted group-based communication object set.

In another variation of process 1000, the permissions interface is a group-based communication object permissions interface configured to enable a user selection of one or more group-based communication actions of a candidate group-based communication action set to generate a permitted group-based communication action set.

In another variation of process 1000, the permissions interface is a group-based communication object permissions interface configured to enable a user selection of one or more group-based communication objects of the candidate group-based communication object set and one or more group-based communication actions of a candidate group-based communication action set to generate a permitted group-based communication object set and a permitted group-based communication action set.

In another variation of process 1000, the permissions interface is a permissions update interface configured to enable a user to authorize a modification of permissions related to at least one of (a) a group-based communication object included in a permitted group-based communication object set or (b) a group-based communication action included in a permitted group-based communication action set.

Figure 11:
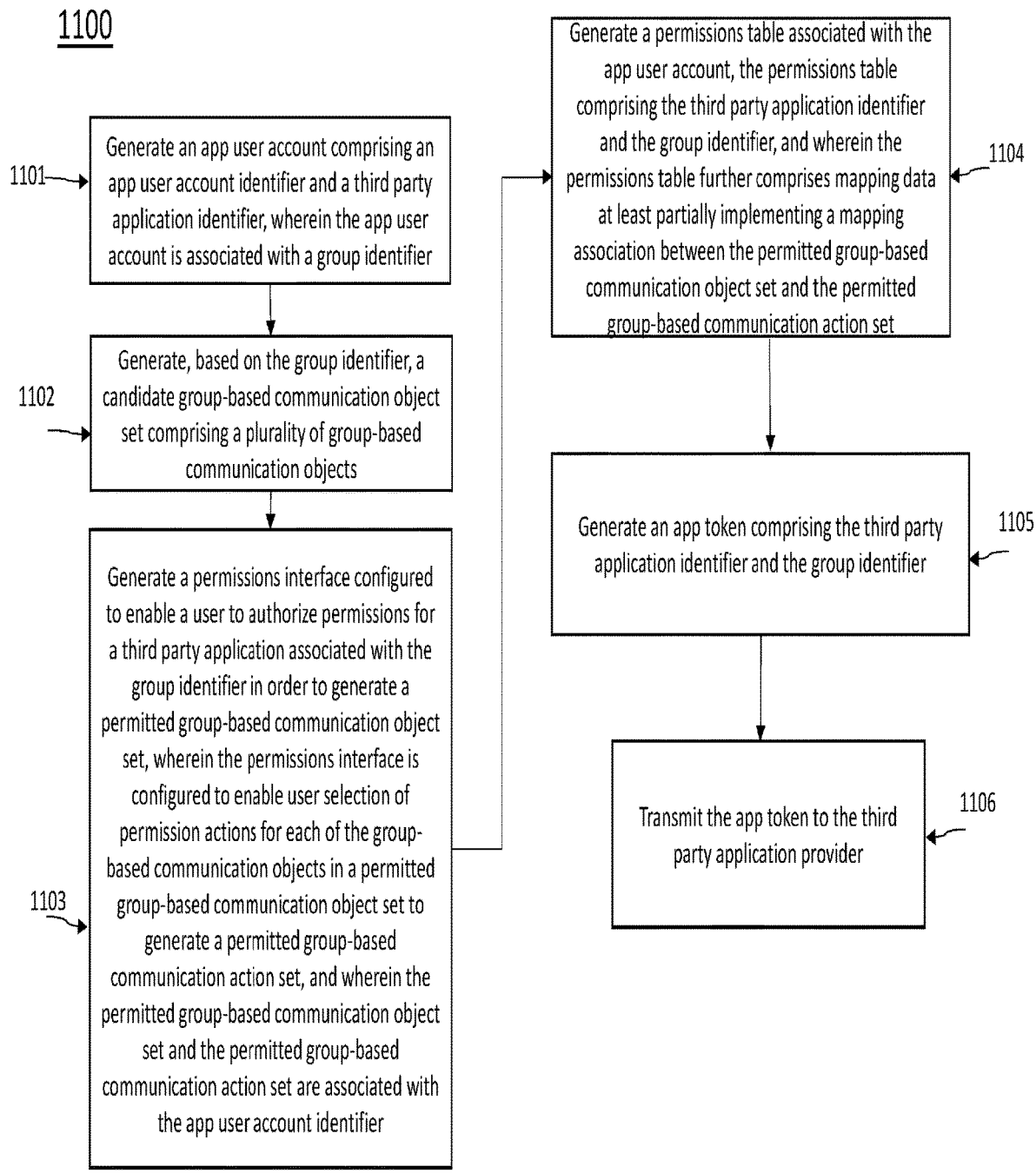

FIG. 11 illustrates process 1100, which is a variation of process 1000. In process 1100, steps 1101-1006 comprise a modified version of steps 1001-1006. The differences are discussed here. The permissions interface, at 1103, is configured to enable user selection of permission actions for each of the group-based communication objects in the permitted group-based communication object set to generate a permitted group-based communication action set. Further, in this embodiment, at 1104, the permissions table further comprises mapping data at least partially implementing a mapping association between the permitted group-based communication object set and the permitted group-based communication action set. Finally, in this embodiment, at 1003 the permitted group-based communication object set and the permitted group-based communication action set are associated with the app user account identifier. The remaining portions of steps 1101-1106 are similar to the steps 1001-1006 already discussed.

In another variation of process 1100, the candidate group-based communication object set is a plurality of group-based communication channels that are accessible to a user associated with the user identifier. Further, the permitted group-based communication object set is a permitted group-based communication channel set.

Figure 12:
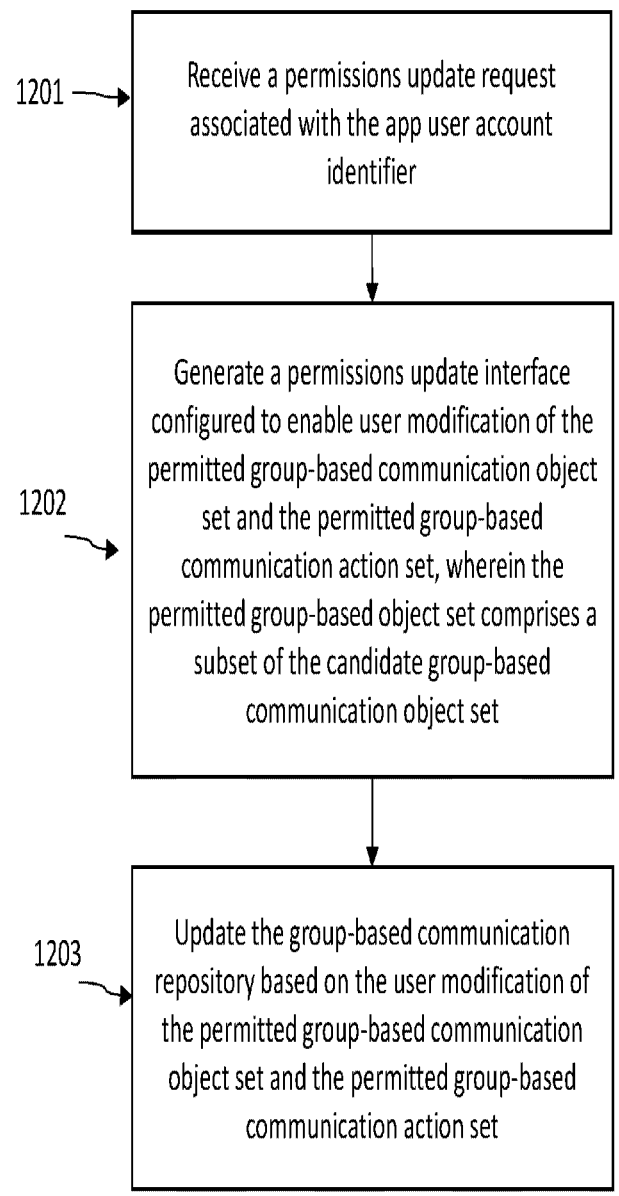

FIG. 12 illustrates process 1200, which is a variation of process 1100. There, at 1201, in addition to steps 1101-1106, the process continues with receiving a permissions update request associated with the app user account identifier 1201. The process then continues with generating a permissions update interface configured to enable user modification of the permitted group-based communication object set and the permitted group-based communication action set 1202. Finally, the process ends with updating the group-based communication repository 107 based on the user modification of the permitted group-based communication object set and the permitted group-based communication action set 1203.

In another embodiment of process 1200, which is a variation of that process, the permissions interface is configured to enable user selection of one or more group-based communication objects of the candidate group-based communication object set to generate a permitted group-based communication object set. Further, the permitted group-based communication object set comprises a subset of the candidate group-based communication object set.

FIG. 13 illustrates process 1300, which is a variation of process 1000. In process 1300, steps 1301-1306 comprise a modified version of steps 1001-1006. There, at step 1302, the candidate group-based communication object set is a plurality of group-based communication channels that are accessible to a user associated with the user identifier. Regarding step 1303, the permitted group-based communication object set is a permitted group-based communication channel set, e permissions interface is a permissions update interface that is configured to enable user selection of permission actions for each of the permitted group-based channel set to generate a permitted group-based communication action set, and the permitted group-based communication channel set and the permitted group-based communication action set are associated with the app user account identifier. Regarding step 1304, the permissions table further comprises mapping data least partially implementing a mapping association between the permitted group-based communication object set and the permitted group-based communication action set. The remaining portions of the process steps 1301-1306 are the same as the corresponding steps 1001-1006 as discussed for process 1000.

In another embodiment and a variation of process 1300, the process includes that each group-based communication channel of the permitted group-based channel set is associated with a channel object set, and the permissions interface is further configured to enable user selection of permission actions for the channel object set.

FIG. 14 illustrates process 1400, which is a variation of process 1000. In addition to all the steps in process 1000, process 1400 also continues with storing, in the permissions table, the candidate group-based communication object set 1401. The process continues, at 1402, with generating the permitted group-based communication object set by: (a) associating a selection indication with each of the one or more group-based communication objects of the candidate group-based communication object set upon user selection via the permissions interface, and (b) associating a permission action with each of the one or more group-based communication objects of the candidate group-based communication object set that is associated with the selection indication upon user selection of the permission action by the permissions interface. The process continues with storing, in the group-based communication repository, the permitted group-based communication object set 1403.

Figure 15:
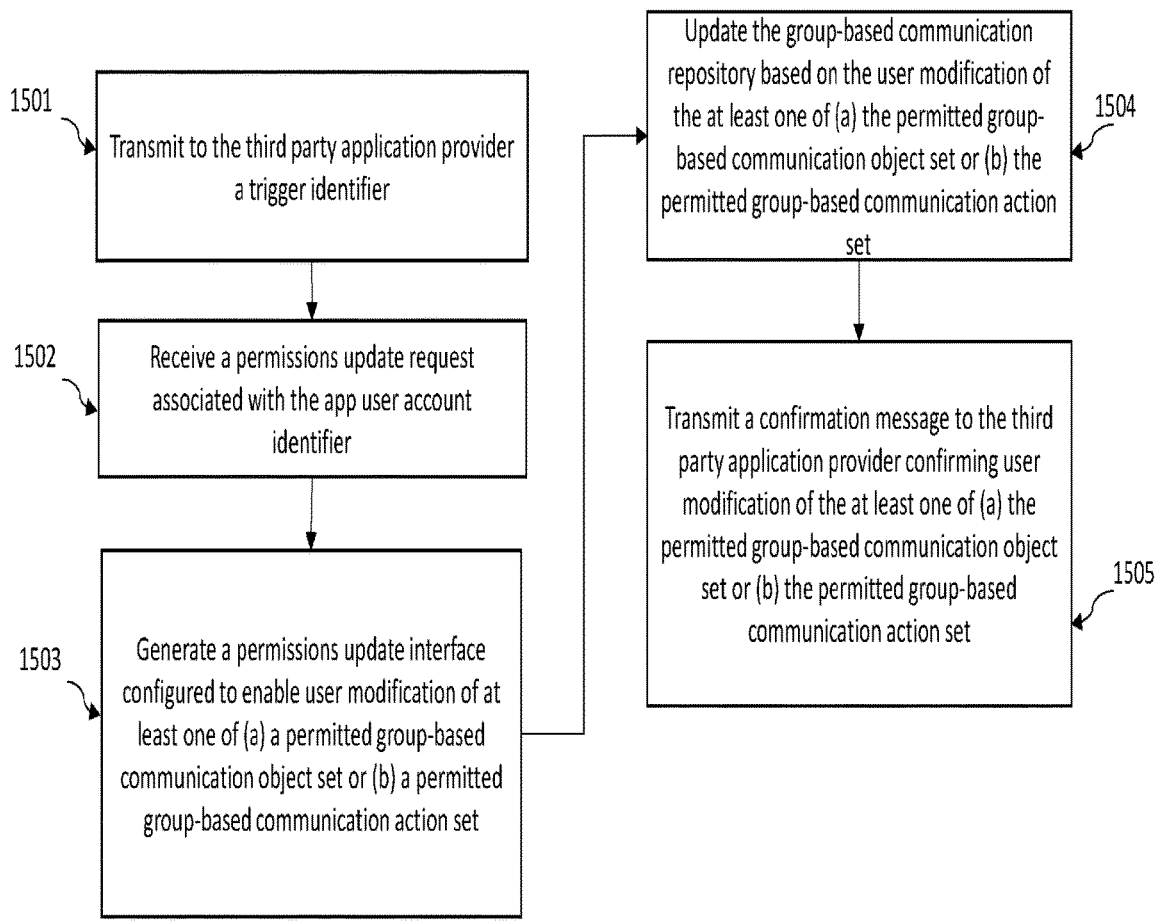

FIG. 15 illustrates process 1500, which is a variation of process 1000. In addition to all the steps in process 1000, process 1500 also continues with transmitting to the third party application provider a trigger identifier 1501. The process continues with receiving a permissions update request associated with the app user account identifier 1502. The process continues with generating a permissions update interface configured to enable user modification of at least one of (a) a permitted group-based communication object set or (b) a permitted group-based communication action set 1503. The process continues with updating the group-based communication repository based on the user modification of the at least one of (a) the permitted group-based communication object set or (b) the permitted group-based communication action set 1504. The process continues with transmitting a confirmation message to the third party application provider confirming user modification of the at least one of (a) the permitted group-based communication object set or (b) the permitted group-based communication action set 1505.

In one embodiment, process 1500 transmitting the trigger identifier to the third party application provider in response to receiving at least one of: (a) a click signal indicating that a user clicked on an interactive button of a group-based communication interface, or (b) a command signal indicating that a user invoked a slash command via the group-based communication interface.

Figure 16:
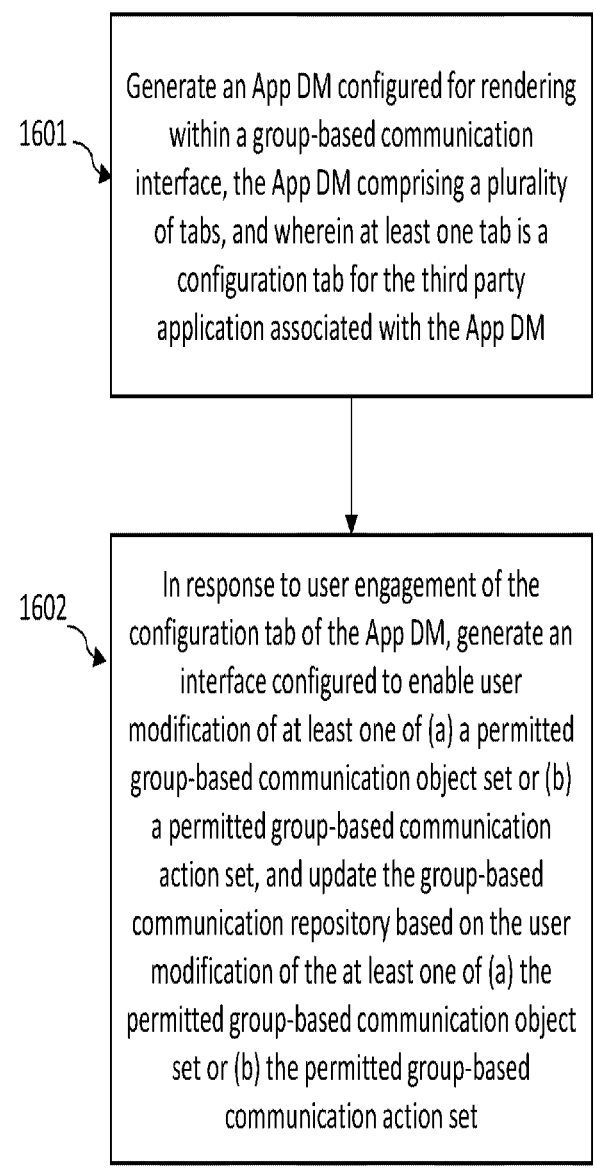

FIG. 16 illustrates process 1600, which is a variation of process 1000. In addition to all the steps in process 1000, process 1600 continues with generating an App DM configured for rendering within a group-based communication interface, the App DM comprising a plurality of tabs, and wherein at least one tab is a configuration tab for a third party application associated with the App DM 1601. The process continues with, in response to user engagement of the configuration tab of the App DM, generating a permissions interface configured to enable user modification of at least one of (a) a permitted group-based communication object set or (b) a permitted group-based communication action set, and update the group-based communication repository based on the user modification of the at least one of (a) the permitted group-based communication object set or (b) the permitted group-based communication action set 1602.

In one embodiment, which is a variation of process 1600, the App DM comprises an App DM group-based communication channel that is configured to display messaging communications posted by the app user account or the third party application provider.

Figure 17:
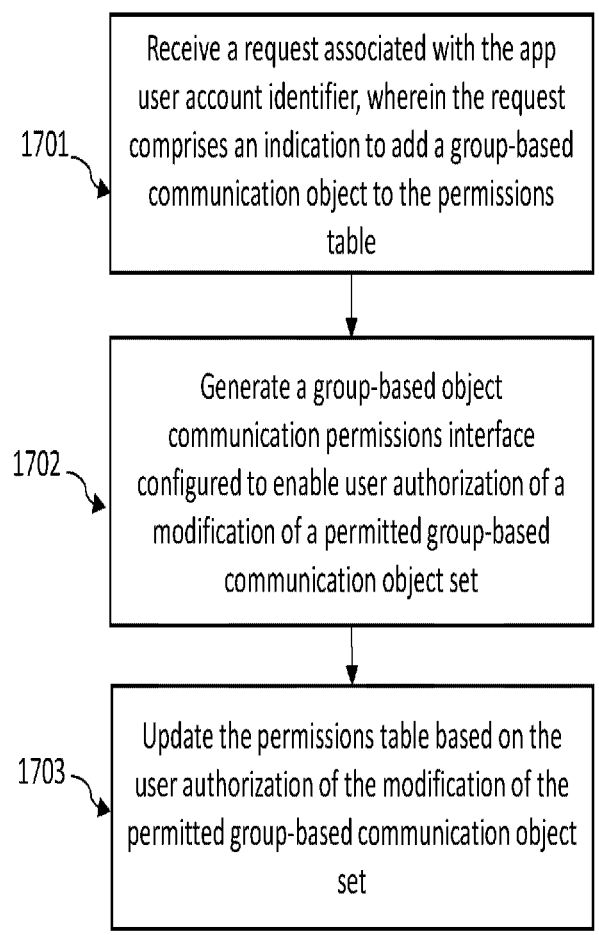

FIG. 17 illustrates process 1700, which is a variation of process 1000. In addition to all the steps in process 1000, process 1700 continues with receiving a request associated with the app user account identifier, wherein the request comprises an indication to add a group-based communication object to the permissions table 1701. The process continues with generating a group-based object communication permissions interface configured to enable user authorization of a modification of a permitted group-based communication object set 1702. The process continues with updating the permissions table based on the user authorization of the modification of the permitted group-based communication object set.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for controlling access to a third-party application (app) on a group-based communication platform, the apparatus comprising:
at least one processor;
at least one memory coupled with the at least one processor; and
instructions stored in the at least one memory and executable by the at least one processor to cause the apparatus to:
provide a group-based communication channel on the group-based communication platform, wherein the group-based communication channel is accessible by a plurality of channel members and supports communication between the plurality of channel members;
provide the third-party app on the group-based communication platform;
receive a request to access the third-party app by a user of the group-based communication channel;
add the third-party app to the group-based communication channel based on the request, wherein the third-party app is accessible to the plurality of channel members based on adding the third-party app to the group-based communication channel;
generate an app token for the third-party app based on authorization by a first channel member of the plurality of channel members; and
grant the third-party app access to one or more data objects associated with the group-based communication channel based on the app token indicating permissions for the third-party app to specifically access the one or more data objects.

2. The apparatus of claim 1, wherein the third-party app is registered with the group-based communication platform.

3. The apparatus of claim 1, wherein the app token is generated based at least in part on an application identifier for the third-party app, a client secret associated with the third-party app, a uniform resource identifier (URI) of the third-party app, or any combination thereof.

4. The apparatus of claim 1, wherein the instructions to add the third-party app to the group-based communication channel are executable by the at least one processor to cause the apparatus to:
initiate installation of the third-party app to the group-based communication channel.

5. The apparatus of claim 4, wherein the instructions are further executable by the at least one processor to cause the apparatus to:
send, for viewing at a user device of the user, the permissions for the third-party app based at least in part on the third-party app being installed for the group-based communication channel.

6. The apparatus of claim 1, wherein the instructions are further executable by the at least one processor to cause the apparatus to:
send, to a user device of the first channel member, a permissions interface for the first channel member to authorize the permissions for the third-party app, wherein the authorization by the first channel member is based on the permissions interface.

7. The apparatus of claim 1, wherein the permissions for the third-party app grant the third-party app permission to access first messages of the group-based communication channel, post second messages of the group-based communication channel, access other content of the group-based communication channel, or any combination thereof.

8. A method of controlling access to a third-party application (app) on a group-based communication platform, the method comprising:
providing a group-based communication channel on the group-based communication platform, wherein the group-based communication channel is accessible by a plurality of channel members and supports communication between the plurality of channel members;
providing the third-party app on the group-based communication platform;
receiving a request to access the third-party app by a user of the group-based communication channel;

adding the third-party app to the group-based communication channel based on the request, wherein the third-party app is accessible to the plurality of channel members based on adding the third-party app to the group-based communication channel;

generating an app token for the third-party app based on authorization by a first channel member of the plurality of channel members; and granting the third-party app access to one or more data objects associated with the group-based communication channel based on the app token indicating permissions for the third-party app to specifically access the one or more data objects.

9. The method of claim 8, wherein the third-party app is registered with the group-based communication platform.

10. The method of claim 8, wherein the app token is generated based at least in part on an application identifier for the third-party app, a client secret associated with the third-party app, a uniform resource identifier (URI) of the third-party app, or any combination thereof.

11. The method of claim 8, wherein adding the third-party app to the group-based communication channel comprises:
initiating installation of the third-party app to the group-based communication channel.

12. The method of claim 11, further comprising:
sending, for viewing at a user device of the user, the permissions for the third-party app based at least in part on the third-party app being installed for the group-based communication channel.

13. The method of claim 8, further comprising:
sending, to a user device of the first channel member, a permissions interface for the first channel member to authorize the permissions for the third-party app, wherein the authorization by the first channel member is based on the permissions interface.

14. The method of claim 8, wherein the permissions for the third-party app grant the third-party app permission to access first messages of the group-based communication channel, post second messages of the group-based communication channel, access other content of the group-based communication channel, or any combination thereof.

15. A non-transitory computer-readable medium storing code for controlling access to a third-party application (app) on a group-based communication platform, the code comprising instructions executable by a processor to:
provide a group-based communication channel on the group-based communication platform, wherein the group-based communication channel is accessible by a plurality of channel members and supports communication between the plurality of channel members;

provide the third-party app on the group-based communication platform;

receive a request to access the third-party app by a user of the group-based communication channel;

add the third-party app to the group-based communication channel based on the request, wherein the third-party app is accessible to the plurality of channel members based on adding the third-party app to the group-based communication channel;

generate an app token for the third-party app based on authorization by a first channel member of the plurality of channel members; and grant the third-party app access to one or more data objects associated with the group-based communication channel based on the app token indicating permissions for the third-party app to specifically access the one or more data objects.

16. The non-transitory computer-readable medium of claim 15, wherein the third-party app is registered with the group-based communication platform.

17. The non-transitory computer-readable medium of claim 15, wherein the app token is generated based at least in part on an application identifier for the third-party app, a client secret associated with the third-party app, a uniform resource identifier (URI) of the third-party app, or any combination thereof.

18. The non-transitory computer-readable medium of claim 15, wherein the instructions to add the third-party app to the group-based communication channel are executable by the processor to:
initiate installation of the third-party app to the group-based communication channel.

19. The non-transitory computer-readable medium of claim 18, wherein the instructions are further executable by the processor to:
send, for viewing at a user device of the user, the permissions for the third-party app based at least in part on the third-party app being installed for the group-based communication channel.

20. The non-transitory computer-readable medium of claim 15, wherein the instructions are further executable by the processor to:
send, to a user device of the first channel member, a permissions interface for the first channel member to authorize the permissions for the third-party app, wherein the authorization by the first channel member is based on the permissions interface.

* * * * *